US006672602B2

(12) United States Patent
Way, II et al.

(10) Patent No.: US 6,672,602 B2
(45) Date of Patent: Jan. 6, 2004

(54) GRAVITY DRIVEN STEERABLE VEHICLE

(76) Inventors: Frederic L. Way, II, 720 Gilead St., Hebron, CT (US) 06248; Steven K. Walton, 315 Deer Ridge Rd., Townshend, VT (US) 05353; David L. Newton, 67 Ridgewood Ave., Keene, NH (US) 03431-2805

( * ) Notice: Subject to any disclaimer, the term of this patent is extended or adjusted under 35 U.S.C. 154(b) by 0 days.

(21) Appl. No.: 09/797,406

(22) Filed: Mar. 1, 2001

(65) Prior Publication Data

US 2001/0028155 A1 Oct. 11, 2001

Related U.S. Application Data

(63) Continuation-in-part of application No. 09/071,523, filed on May 1, 1998, now Pat. No. 6,276,700.
(60) Provisional application No. 60/186,185, filed on Mar. 1, 2000, provisional application No. 60/159,465, filed on Oct. 13, 1999, and provisional application No. 60/045,490, filed on May 2, 1997.

(51) Int. Cl.[7] .............................................. B62B 11/00
(52) U.S. Cl. .................................... 280/87.01; 280/267
(58) Field of Search ........................ 280/87.01, 87.021, 280/87.03, 87.042, 87.043, 87.05, 21.1, 22, 28.11, 28.14, 28.15, 28.16, 263, 267, 269, 400, 16, 18

(56) References Cited

U.S. PATENT DOCUMENTS 1,115,617 A * 11/1914 Thydean ..................... 180/196
1,524,563 A * 1/1925 Lang ............................. 280/8
1,722,574 A * 7/1929 Hood ........................... 280/16
2,063,627 A * 12/1936 Ruf ................................ 280/8
2,750,198 A * 6/1956 Moore et al. ................. 280/22
2,966,364 A * 12/1960 Plumb ........................... 188/8
3,104,115 A * 9/1963 Moore ........................... 280/8

(List continued on next page.)

Primary Examiner—Brian L. Johnson
Assistant Examiner—Bridget Avery
(74) Attorney, Agent, or Firm—George W. Dishong

(57) ABSTRACT

A gravity driven steerable vehicle having wheels, or skis or a combination of wheels and skis for recreational use, most particularly on surfaces such as pavement, artificial hard-pack turf, mountain slopes, dirt roads, grass and hard-packed or non-packed snow. The vehicle has at least three (3) but preferably four (4) wheels, or skis or a combination of wheels and skis which may or may not be on independent axles one from the other and which may or may not be each independently shock suspended. There is also a steering mechanism for steering the vehicle and a driver compartment portion for containing a driver of the vehicle in a prone face-down and face-forward position. The vehicle is steerable by the driver from the prone face-down and face-forward position. The mechanism for suspension of the wheels and/or skis is configured to provide precise control in turns especially the carving of turns, by the skis, while descending on snow covered terrain. The attitude of the skis relative to the snow surface changes upon initiation of a turn and while in the turn to increase the edgeing of the skis thereby enhancing the turning characteristics of the vehicle. The vehicle may further have a braking system for slowing or stopping the vehicle and a harness apparatus for harnessing the driver onto and into the vehicle.

5 Claims, 19 Drawing Sheets

U.S. PATENT DOCUMENTS

| | | | |
|---|---|---|---|
| 3,345,080 A | * 10/1967 | Schneiderman | 188/2 R |
| 3,374,000 A | * 3/1968 | Wetzel | 280/16 |
| 3,391,947 A | * 7/1968 | Hodas | 280/87.01 |
| 3,580,592 A | * 5/1971 | Schrecengost | 280/8 |
| 3,718,344 A | * 2/1973 | Lohr et al. | 280/261 |
| 3,734,523 A | * 5/1973 | Field | 188/8 |
| 3,799,565 A | * 3/1974 | Burtis et al. | 180/182 |
| 4,046,392 A | * 9/1977 | Dredger et al. | 248/228.1 |
| 4,076,266 A | * 2/1978 | Krausz | 16/35 R |
| 4,098,519 A | * 7/1978 | Reid, Jr. | 280/102 |
| 4,134,599 A | * 1/1979 | DiMille et al. | 188/29 |
| 4,218,098 A | * 8/1980 | Burton | 301/5.7 |
| 4,244,593 A | * 1/1981 | Malone | 280/14 |
| 4,413,832 A | * 11/1983 | Pendleton | 280/18 |
| 4,542,908 A | * 9/1985 | Muyskens | 280/22.1 |
| 4,909,524 A | * 3/1990 | Paine | 2/46 |
| 5,513,865 A | * 5/1996 | Brooks et al. | 280/87.042 |
| 5,601,296 A | * 2/1997 | Reinhard | 280/18 |
| 5,673,772 A | * 10/1997 | Martin | 188/6 |
| 5,810,376 A | * 9/1998 | Matheny | 280/87.021 |
| 5,927,732 A | * 7/1999 | Snyder | 280/87.01 |
| 6,035,976 A | * 3/2000 | Duhamel | 188/5 |
| 6,116,622 A | * 9/2000 | Gibbons | 280/16 |
| 6,276,700 B1 | * 8/2001 | Way et al. | 280/267 |

* cited by examiner

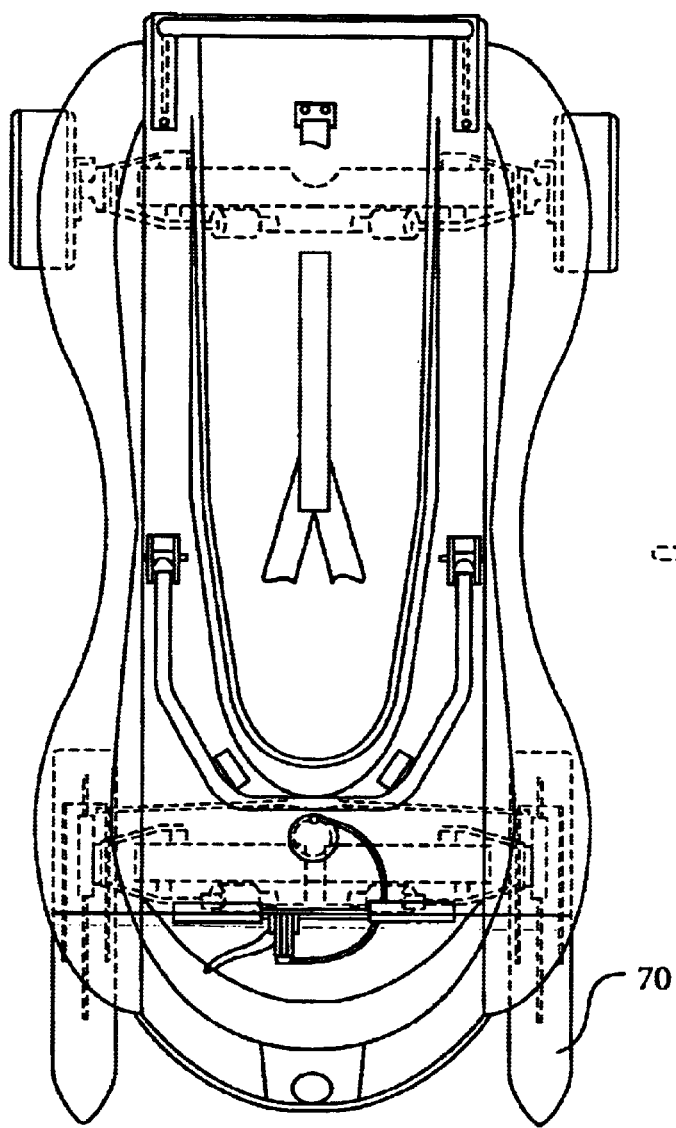
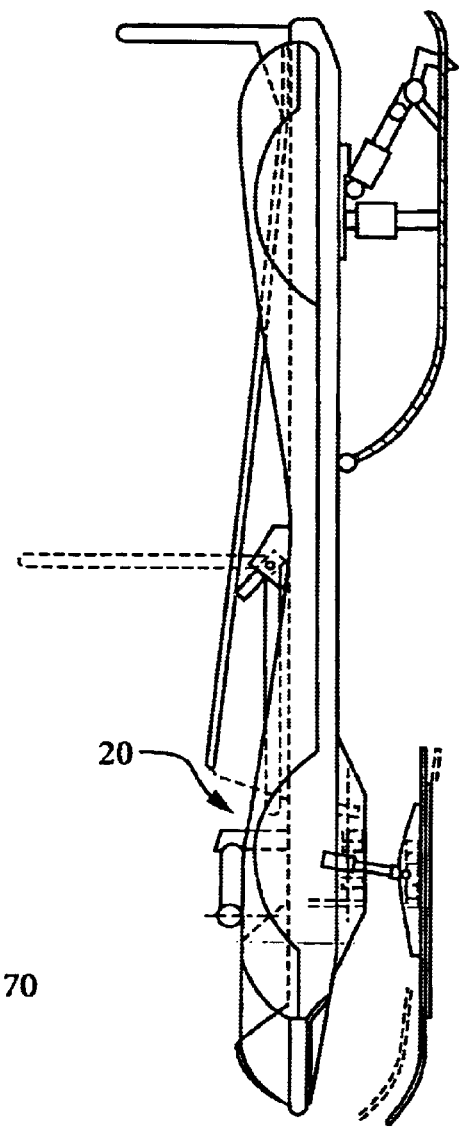
FIG. 13A  FIG. 13B
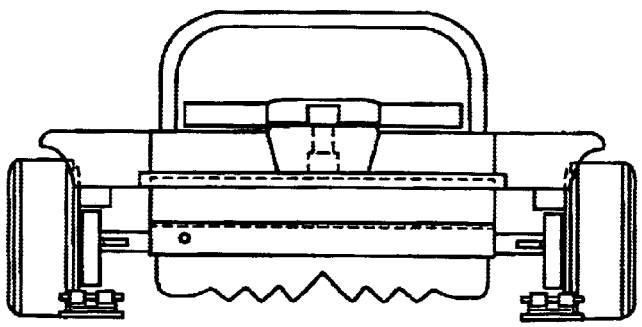
FIG. 13C

GRAVITY DRIVEN STEERABLE VEHICLE

This application claims the benefit of U.S. Provisional Application No. 60/186,185, filed Mar. 01, 2000 U.S. Provisional Application No. 60/159,465, filed Oct. 13, 1999. This application is a continuation-in-part of U.S. application Ser. No. 09/071,523, filed May 01, 1998, U.S. Pat. 6,276,700 B1, issued Aug. 21, 2001, which application claims the benefit of U.S. Provisional Application No. 60/045,490 filed May 02, 1997.

STATEMENT REGARDING FEDERALLY SPONSORED RESEARCH OR DEVELOPMENT

Not Applicable.

BACKGROUND OF THE INVENTION

1. Field of the Invention

This invention most generally relates to gravity driven vehicles such as downhill racing carts. More particularly this invention relates to maneuverable, steerable gravity driven vehicles Most particularly, the invention relates to a stable, durable gravity driven vehicle which is steerable, has at least two wheels or two skis or a combination of wheels and skis and at least one brake, is ridden in a prone, face down, face forward position and which may be ridden on varied surface terrain such as dirt, grass or snow. Even more particularly this invention relates to the mechanism for suspension of the wheels and/or skis which is configured to provide precise control in turns especially the carving of turns, by the skis, while descending on snow cover.

2. Description of Related Art

Although there are various patents disclosing embodiments for devices which permit movement over a surface, the following patents known to the inventors hereof, do not in any manner suggest or teach the Gravity Driven Steerable Wheeled or ski equipped Vehicle disclosed and claimed by applicants in the instant application for patent.

U.S. Pat. No. 3,887,210 to Funke discloses a four wheeled, downhill racing cart with a steel frame and a driver's seat mounted on the frame for use on various surfaces. The rider of the cart must sit in an upright position with feet forward. The cart is steered by applying pressure with the feet to pedals attached to the front axle assembly. There is a braking mechanism which is triggered by leaning forward in the seat and engaging a braking member which is suspended from the seat frame. When the seat is leaned forward and the braking member is engaged, a plate is lowered to contact the ground surface and apply braking by frictionous contact with the ground. A rubber pad is fastened to the underside of the braking plate for braking engagement with the surface over which the cart is traveling. The cart does have handle bars, however, they are not used at all for steering control of the vehicle. The handles appear to be used for holding on and keeping the rider with the cart. The device also has carry hooks on the front handle assembly for towing of the device to the starting area. Additionally, the device can be fitted with a "roll-bar" attachment.

U.S. Pat. No. 4,098,519 to Reid, Jr. device looks most like the known "flexible flyer" type of snow sled. This wheeled sled has four wheels and may be ridden on a variety of surfaces in a sitting or prone position. The body of the device is not inclined and is composed of several, separate, wooden slats. There are slots in the body of the device for gripping when riding in a seated position. However, the prone position would be preferred in order for the user to operate the two hand brakes installed on the handle bars at the front of the device. The device is steered by way of crossed steering bars pivoted to each of the rear axle brace, front axle brace, and steering handle. The steering bars are connected diagonally to opposite positions on the front and rear axles such that the axle braces are pivoted in opposite directions as the steering handle is moved—this minimizes turning radius. Springs return the steering handle to a neutral, centered position when there is no pressure on the steering handle. The hand brakes act on the front wheels. This device does not have any sort of tow hook for pulling the sled to a starting position. There is no restraining device or harness on this, or any of the previously described sleds. There is also no "roll-bar" or any sort of plate or device to prevent injury or to keep the sled from tipping over.

U.S. Pat. No. Des. 331,031 to Janoff discloses a design for a land sled. Design patents cover only the look of the device depicted in the Figures and no real description of the device is included in a design patent. This particular land sled differs from the two previously described devices in several ways. It has two large roller type wheels, instead of four smaller wheels. It is capable of being steered by either the hands or feet and can be ridden sitting in an upright position (steering with the feet) or in a prone position (steering with the hands). The steering appears to be accomplished in a way similar to that of known "flexible flyer" type snow sleds—by pushing and/or pulling the large handle bar extending across the front of the device. There are also slots along the side of the sled, towards the back, for gripping when using the sled from a seated position. There does not appear to be any sort of incline to the main body of the sled, on which one would sit or lay prone, although it is difficult to determine much about the mechanics of a device from a design patent.

U.S. Pat. No. 5,354,081 to Huffman et. al. discloses a stunt-riding toy for use on a variety of surfaces including snow. The device may be fitted with four wheels, or skis. This vehicle has a seat and also must be operated from a sitting position, with the feet placed on plates near the front of the device. The device is quite narrow and is steered mainly by leaning in the direction it is desired to turn. The front foot plates also serve as a brake and a means to keep the vehicle from leaning too far and tipping over. If the vehicle leans too far, the plates will contact the ground surface, apply braking pressure and prevent further tipping. The device has two handles and a rear hand cable brake which pulls a plate into contact with the wheels when the hand brake is engaged. The handles are positioned near the rear of the device, close to the seat so that the rider's arms hang down along the rider's side to grip the handles, and keep the rider in an upright position.

The invention has the particular objectives, features and advantages of: 1) a steerable gravity driven vehicle; 2) that such vehicle is ridden in a prone, face forward position; 3) that such vehicle has at least one brake; 4) that such vehicle has a plurality of wheels, most preferably four (4) wheels however the sled having three (3) wheels—the single wheel preferably located between the legs of the driver—is also disclosed and is within the scope of the disclosure of the invention; 5) that such vehicle may alternatively have a combination of skis and wheels providing for enhanced performance for use on snow covered terrain; 6) that such vehicle may alternatively have at least one ski forward or in the front position of the vehicle and a slide pan toward the rear portion of the vehicle; 7) that such vehicle may alternatively have at least 3 skis, wherein either one ski is forward or in the front position of the vehicle or toward the rear portion of the vehicle; 8) that such vehicle as described in 1) though 7) above may have incorporated therein the mechanism for suspension of the wheels and/or skis which is configured to provide precise control in turns especially the carving of turns, by the skis, while descending on snow cover; and 9) that such vehicle as described in 1) through 4) above may be retrofitted with components in order to create the vehicle(s) described in 5), 6), 7) and 8) above.

The patents noted herein provide considerable information regarding the developments that have taken place in this field of non-motorized vehicle technology. Clearly the instant invention provides many advantages over the prior art inventions noted above. Again it is noted that none of the prior art meets the objects of the gravity driven vehicle in a manner like that of the instant invention. None of them is as effective and as efficient as the instant Gravity Driven Steerable Vehicle for maneuvering down steep, varied surface terrain and none of them are operated from the prone face down and face forward position.

SUMMARY OF THE INVENTION

The most fundamental objects and advantages of the invention are: 1) a steerable gravity driven vehicle; 2) that such vehicle is ridden in a prone, face down, face forward position; 3) that such vehicle has at least one brake; 4) that such vehicle has at least two wheels or skis/slide pan or a combination thereof; 5) that such vehicle has a steering suspension mechanism which provides for the carving, by the steerable skis, of precise turns on snow covered surfaces: and 6) a kit of components which are used to retrofit a wheeled vehicle to one with wheels, skis, pan or a combination of wheels, skis or pan.

It should be noted that where there are three (3) wheels on the vehicle, the third wheel may be located either at the front or the rear of the vehicle. The third wheel may be the same size as the other two wheels, or may be large or smaller. The third wheel may be independently steerable, or steerable in cooperation with the steering of the other two wheels.

The vehicle may have independent mechanical, air actuated or hydraulic actuated brakes and may have independent hydraulic shock absorbers on some or all wheels. But the vehicle need not have shock absorbers at all, or may have shock absorption only for the front wheels, for example. The vehicle also may have an attachment for the picking up of the vehicle by, for example, a ski chair lift, and which may be a part of the driver/operator restraint system acting to keep the operator's legs from drifting off of the vehicle especially in a sharp turn maneuver. The attachment for picking up the vehicle may further serve to protect the rider should the vehicle roll over. However, this attachment is not fundamental to the invention.

A primary object of the invention is to provide a gravity driven steerable vehicle comprising a chassis and a riding surface on which a rider is oriented in a prone, face down, face forward position, at least two wheels or skis or combination thereof, means for steering the vehicle, means for causing deceleration or halting of motion of the vehicle, and means for harnessing the rider onto and into the vehicle.

Another primary object of the invention is to provide means for steering each wheel independently.

A further primary object of the invention is to provide means for absorbing shock exerted on said vehicle caused by the vehicle passing over rough terrain.

Another object of the invention is to provide means for towing the vehicle to the top of an incline, and means for assisting the rider in staying on the vehicle and protecting the rider if the vehicle were to roll over.

Yet another object of the invention is to provide such a vehicle further comprising four wheels.

Another object of the invention is to provide such a vehicle having three wheels.

A still further object is to provide a safety brake which actuates upon release of the hand grips for operation and parking safety if a rider were to fall off of the vehicle during operation of the vehicle.

A yet still further object is to provide a means for automatically causing the vehicle to hold a constant turn which actuates upon the occasion if a rider were to fall off of the vehicle during operation of the vehicle.

A fundamental object of this invention is to provide a means or mechanism for suspension of the wheels and/or skis which means or mechanism is comprises a single a-arm pivotably attached to an axle at an axle pivot point and a shock absorber connecting end pivotably connected to one end a shock absorber and which shock absorber other end pivotably connected to said axle. The suspension system may be provided preferably independent for each wheel or ski or on only the front axle of the vehicle. The suspension system configured to provide precise control in turns especially the carving of turns, by the skis, while descending on snow covered terrain.

Another fundamental object of the invention is to provide a ski assembly having front end and a ski rear end, a ski running surface and a ski upward-facing surface and having a ski brake assembly configured to cause, when said brake assembly is operator actuated, a brake blade to extend below said ski running surface at said ski rear end thereby engaging the terrain surface upon which the ski is running. There may also be provided a brake return assembly preferably using springs to return said brake blade to a non-braking position.

These and further objects of the present invention will become apparent to those skilled in the art after a study of the present disclosure of the invention and with reference to the accompanying drawings which are a part hereof, wherein like numerals refer to like parts throughout, and in which:

BRIEF DESCRIPTION OF THE SEVERAL VIEWS OF THE DRAWINGS

FIG. 1 is a combination of a top plan view, a side plan view and a front plan view of the vehicle all of which are illustrating the body curvatures, the rider inclined riding surface/bed and the like;

FIGS. 13A, 13B and 13C are a top plan view, and side plan view and a rear plan view respectively showing, in shadow, substantially all of the components and their relationship and which illustrates a wheeled vehicle retrofitted with skis on the front and a slide pan to the rear which slide pan has grooves directed from front to rear which provide lateral stabilizing of the vehicle and which has a suspension system and a piston actuator which actuates braking by pressing the shovel/blade into the snow surface;

DESCRIPTION OF THE PREFERRED EMBODIMENTS

Figure 1:
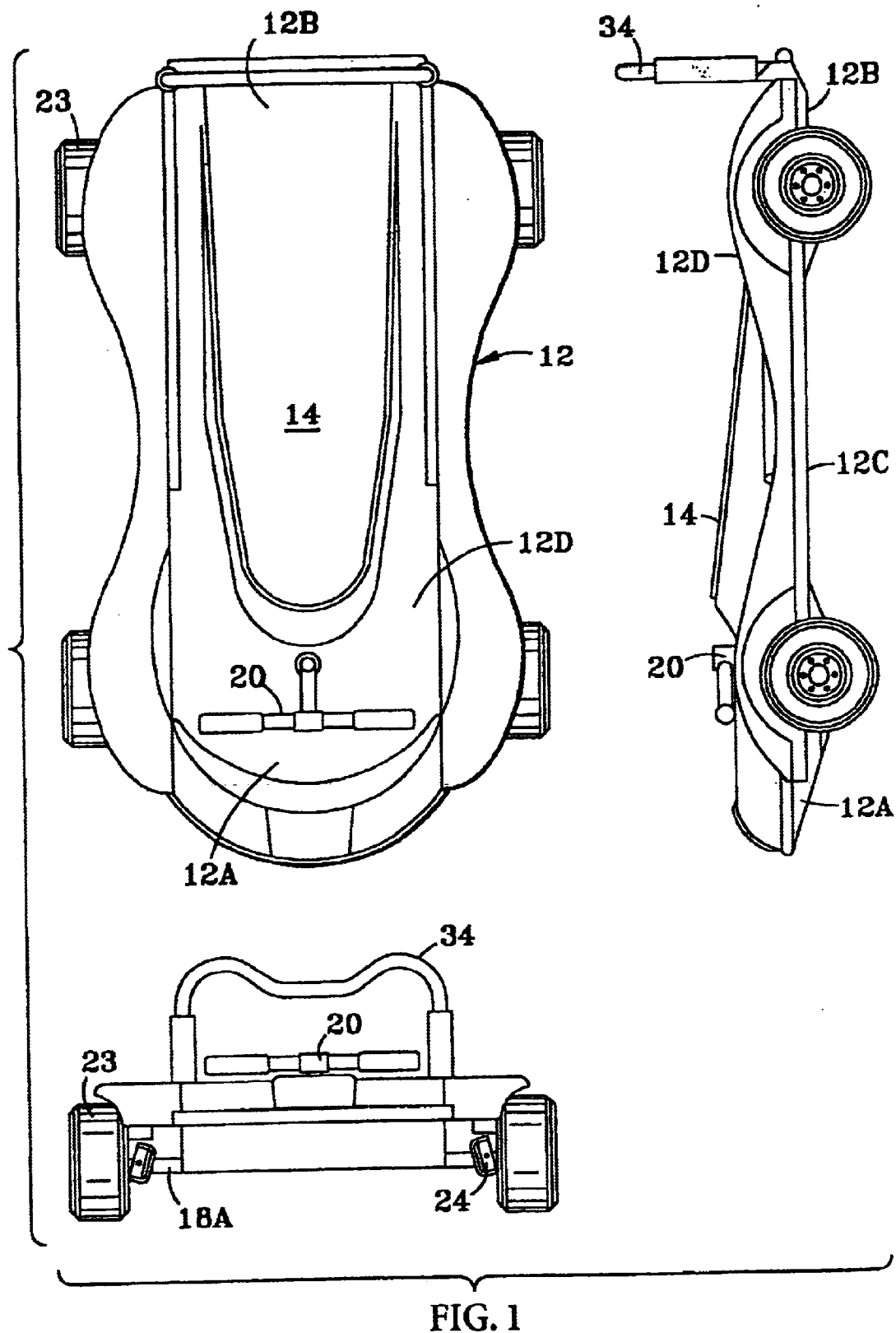

The following is a description of the preferred embodiment of the invention. It is clear that there may be variations in the size and the shape of the gravity driven wheeled vehicle, in the materials used in the construction and in the orientation of the components. Most importantly, the teaching of the wheeled version of the gravity driven vehicle is applicable to the version having skis or pans mounted in place of some or all of the wheels and which is used as a gravity driven vehicle on snow or ice covered downhill terrain. The stability in the absorbing of shock from uneven surface conditions and the stability and performance while making turns while going downhill derives from the combination of the steering and suspension geometry and the inherent shape of the skis mounted in place of the wheels and tires.

A. The Wheeled Gravity Driven Vehicle:

In order to most simply and clearly characterize the essential features of the invention reference is made to drawing FIGS. 1, 1A, 1B, 2, 3, 6 and 10 in which the essential elements of the invention are identified by numerals (not in a circle). FIGS. 4, 5, 7, 8 and 9 are details of various elements which are well known to the ordinary skilled artisan.

It is also important to note that the instant vehicle invention may have one wheel in front and one wheel in the rear. It is also possible to have three wheels with the single wheel either in the front or in the rear of the vehicle. Steering may be effected by using either the front wheel(s) or the rear wheel(s) or both. Braking combinations are likewise possible—front wheel, rear wheel or both.

With reference now to particularly FIGS. 1, 2, 3, 6, 10, 14A, 14B, 15A and 15B there is illustrated a four wheeled gravity driven steerable wheeled vehicle 10. There is a chassis 12 having chassis front portion 12A, chassis rear portion 12B, chassis underside 12C and chassis top side 12D. A rider riding surface 14 is on chassis top side 12D and is configured to cause a rider on rider riding surface 14 to be oriented in a prone, face down, face forward position. There is provided a means for attaching, 16, a rear axle assembly 16A substantially at chassis rear portion 12B. There is also means for mounting, 18, a front axle assembly 18A substantially at chassis front portion 12A.

Provided also is a means for steering, 20, gravity driven steerable wheeled vehicle 10 or three-wheeled vehicle 40 by the rider when the rider is positioned on rider riding surface 14. There are rear wheel hub and spindle assemblies 22 integral with rear axle assembly 16A. Wheels and tires 23 are normally mounted to the wheel hub. Front wheel hub and spindle assemblies 24 are integral with front axle assembly 18A.

A braking system or means for causing deceleration and halting of motion 26 of vehicle 10 when vehicle 10 (or 40) has motion is provided. Braking system 26 may be hydraulic, mechanical or a combination of the two and braking may be of all wheels or some of the wheels.

In order to help the rider stay on vehicle 10 or 40, there is a means for harnessing 28 the rider onto and into rider riding surface 14 when the rider is positioned on the vehicle. To provide additional comfort for the rider and to improve the stability of the vehicle while moving, there may be provided means for absorbing shock 20 exerted on each of the front wheels and tires 23 attached to each of the two front wheel hub and spindle assemblies 24 thereby damping shock caused by vehicle 10 passing over rough terrain, between front wheels and tires 23 and front axle assembly 18A. There may also be means for absorbing shock 32 exerted on each of the rear wheels and tires 23 attached to each of the two rear wheel hub and spindle assemblies 22 thereby further damping shock.

In order to get wheeled vehicle 10 or 40 or ski equipped vehicle 10A or 40A up a ski slope for example, there is provided a combination rear roll bar and transport bail 34. When the rider is on the vehicle, bar 34 is in the lowered position providing the rider with a roll bar and an object against which pressure may be applied when the rider is in a sharp turn. Bar 34 is placed in a second position which permits attachment to a lift such as a ski lift.

In order to discuss some of the engineering features, reference is again made to the drawings including FIGS.

4–19. The drawings show simply the preferred embodiments of the wheeled and the ski equipped vehicle which have the following preferred specifications:

FIG. 1 shows a top, side, and front plan view of the vehicle, illustrating the body curvatures, the rider inclined riding surface/bed including the 11" diameter high speed pneumatic, tubeless tires in the preferred embodiment of the vehicle, which are designed for motor vehicle racing at speeds in excess of 100 mph and which provide excellent traction and a soft but firm ride.

Figure 3:
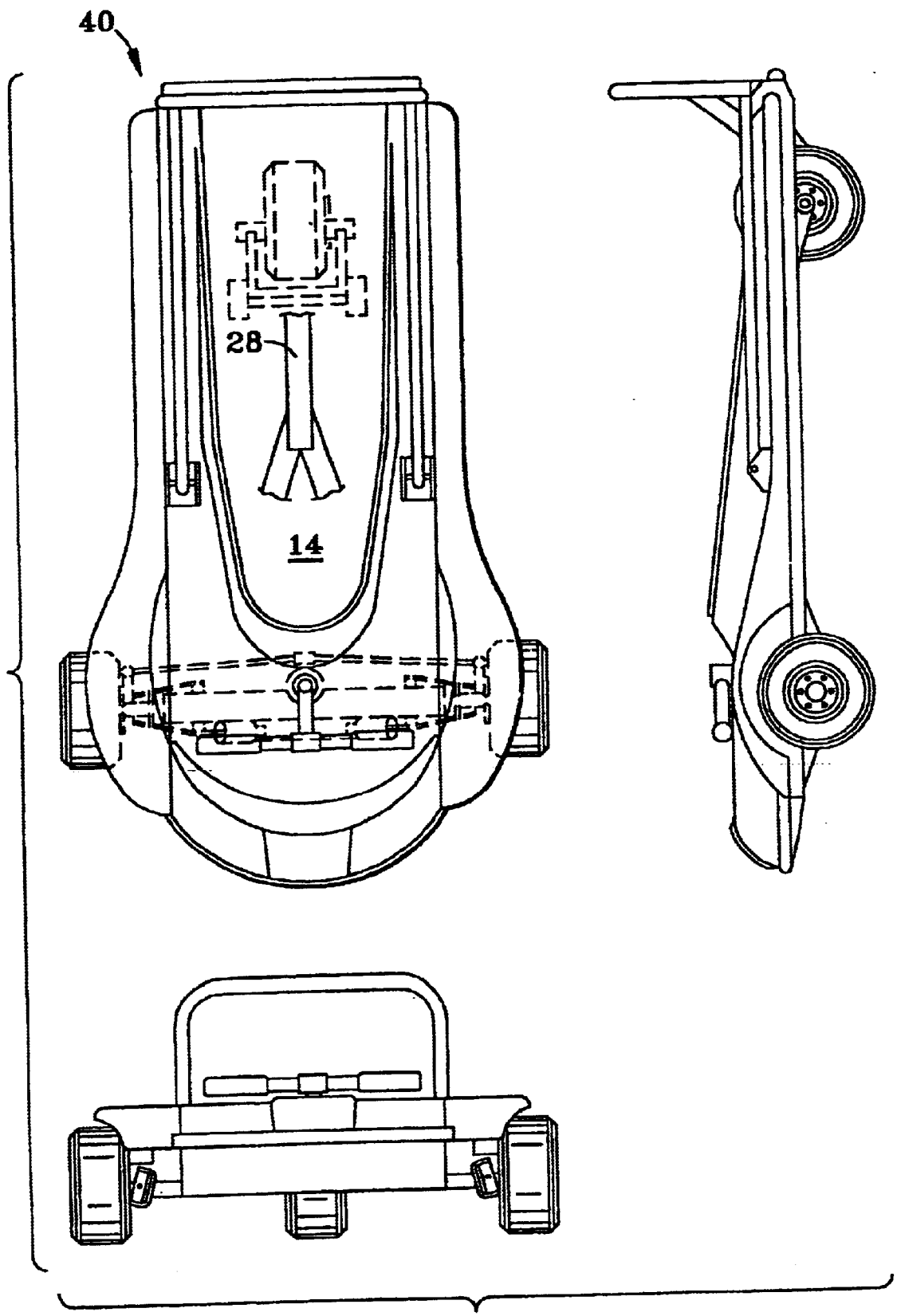
FIG. 3 shows a top plan view of the three (3) wheeled embodiment of the vehicle.
Figure 4:
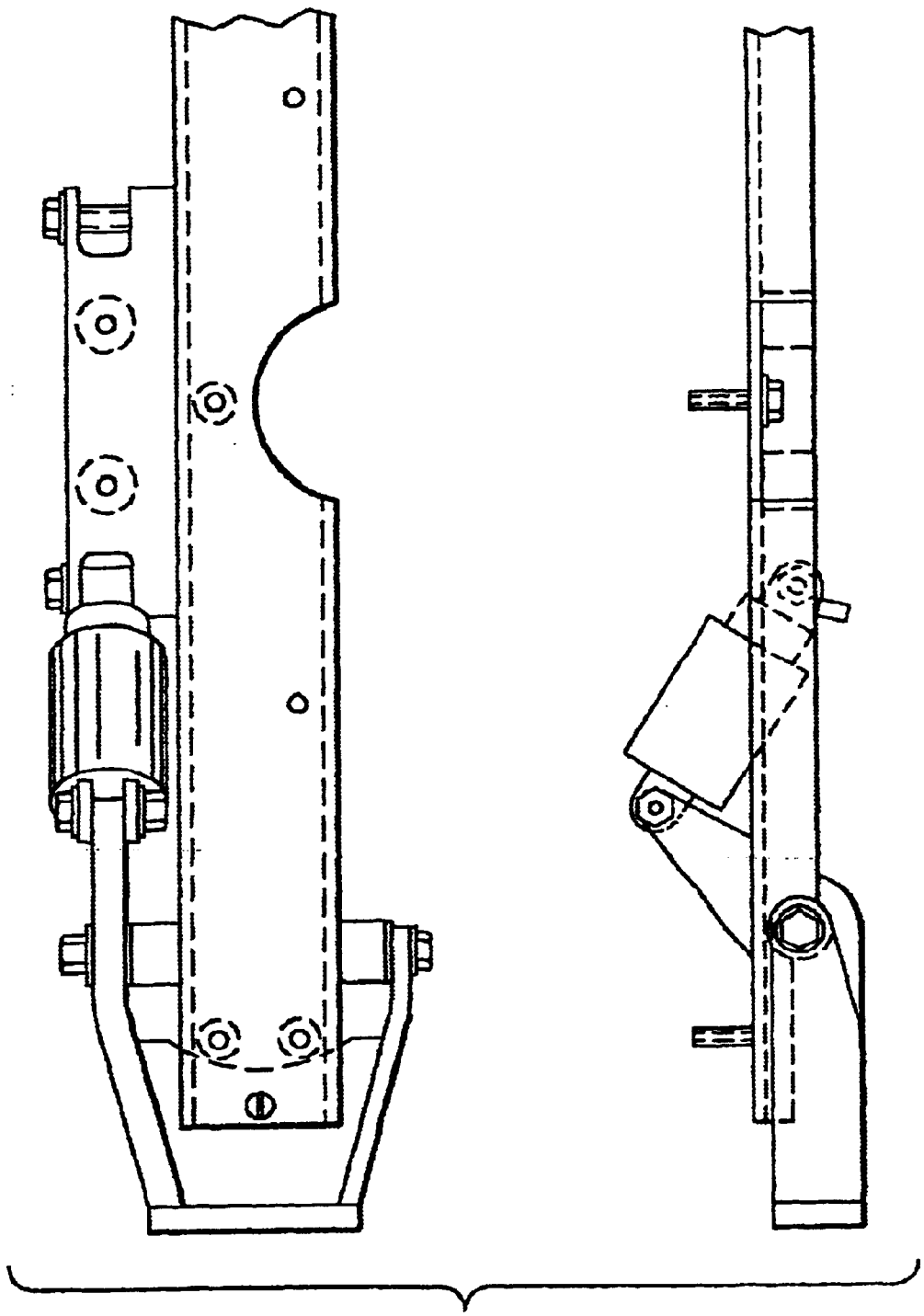
FIG. 4 is a detail view of the assembly axle with an air/oil shock used in the wheel suspension.
Figure 5:
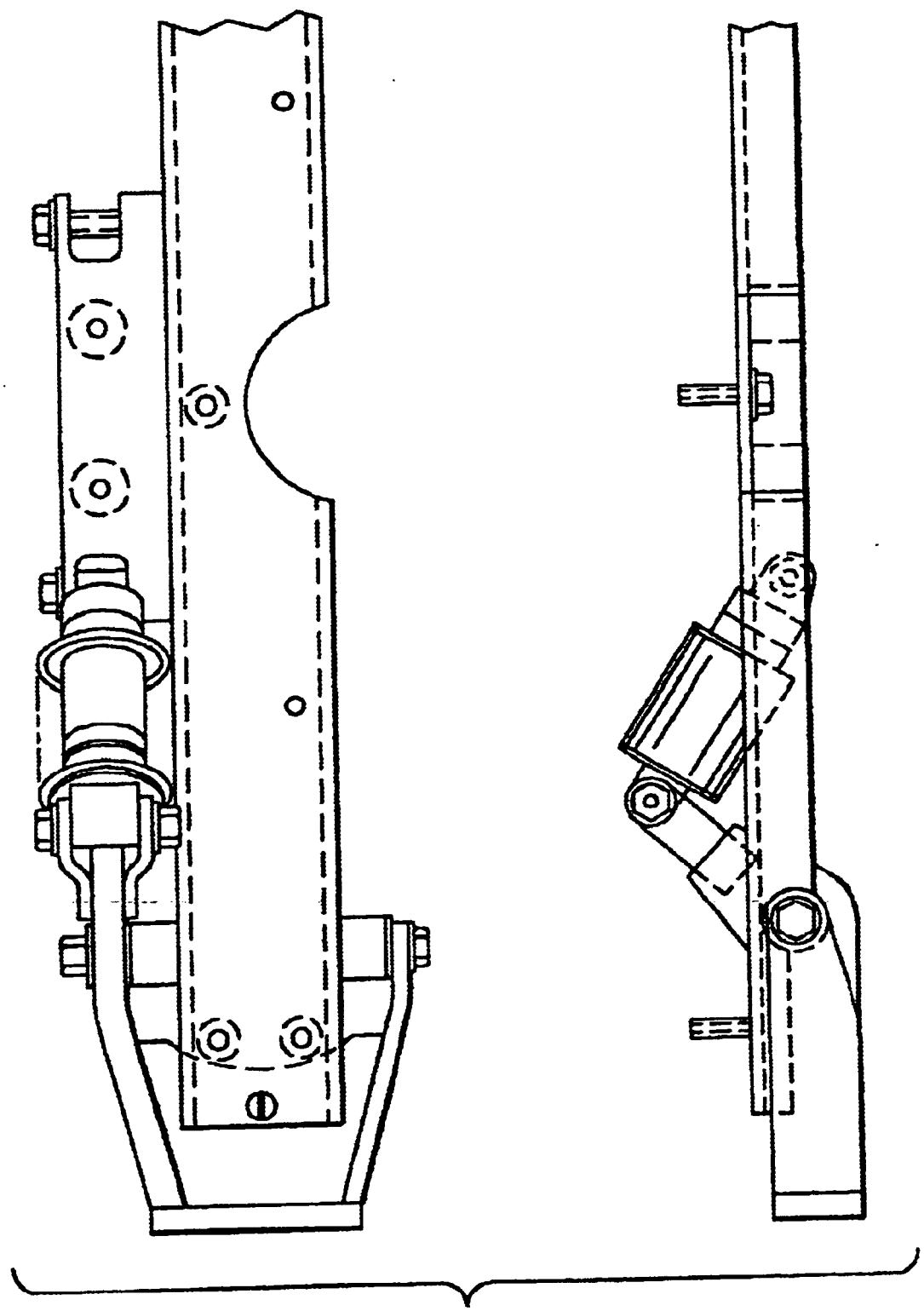
FIG. 5 is a detail view of the assembly axle with a coil/oil shock used in the wheel suspension.

Advanced four wheel "A" arm air spring, oil damped suspension—independent four wheel suspension with air/oil shocks or with coil/oil shocks is provided and yields a smooth, stable ride over surfaces with irregularities ranging from wash board to large bumps. However, not all four wheels need have suspension, possibly only the front wheels might have suspension. Also, the vehicle could be made in either a four-wheeled or three wheeled embodiment. In either embodiment, the suspension is not essential. FIG. 3 illustrates a three (3) wheeled embodiment of the vehicle. FIG. 4 shows a detail view of the assembly axle with an air/oil shock used in the wheel suspension, and FIG. 5 shows a detail view of the assembly axle with a coil/oil shock used in the wheel suspension.

Figure 6:
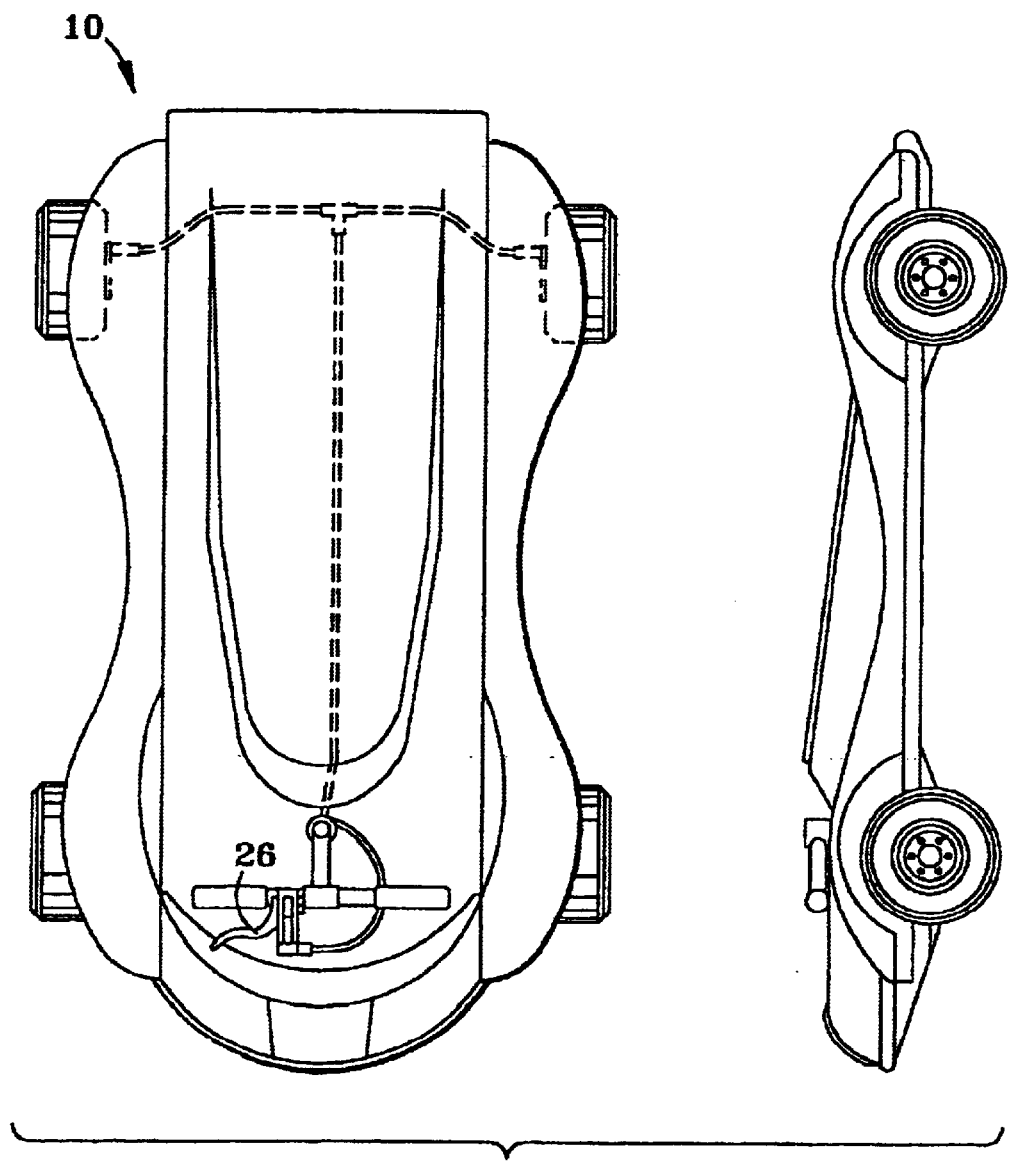
FIG. 6 is a detail view of the hydraulic rear wheel brake system.

Independent hydraulic braking is provided from dual, real wheel, hydraulic disk brakes, designed for motor vehicle racing at speeds to 150 mph and operated with a single hand lever. These brakes give smooth, uniform and powerful braking capability whether with a four or three-wheeled embodiment. The braking system could be modified for a three-wheeled embodiment. FIG. 6 is a detail view of the hydraulic rear wheel brake system.

Figure 17:
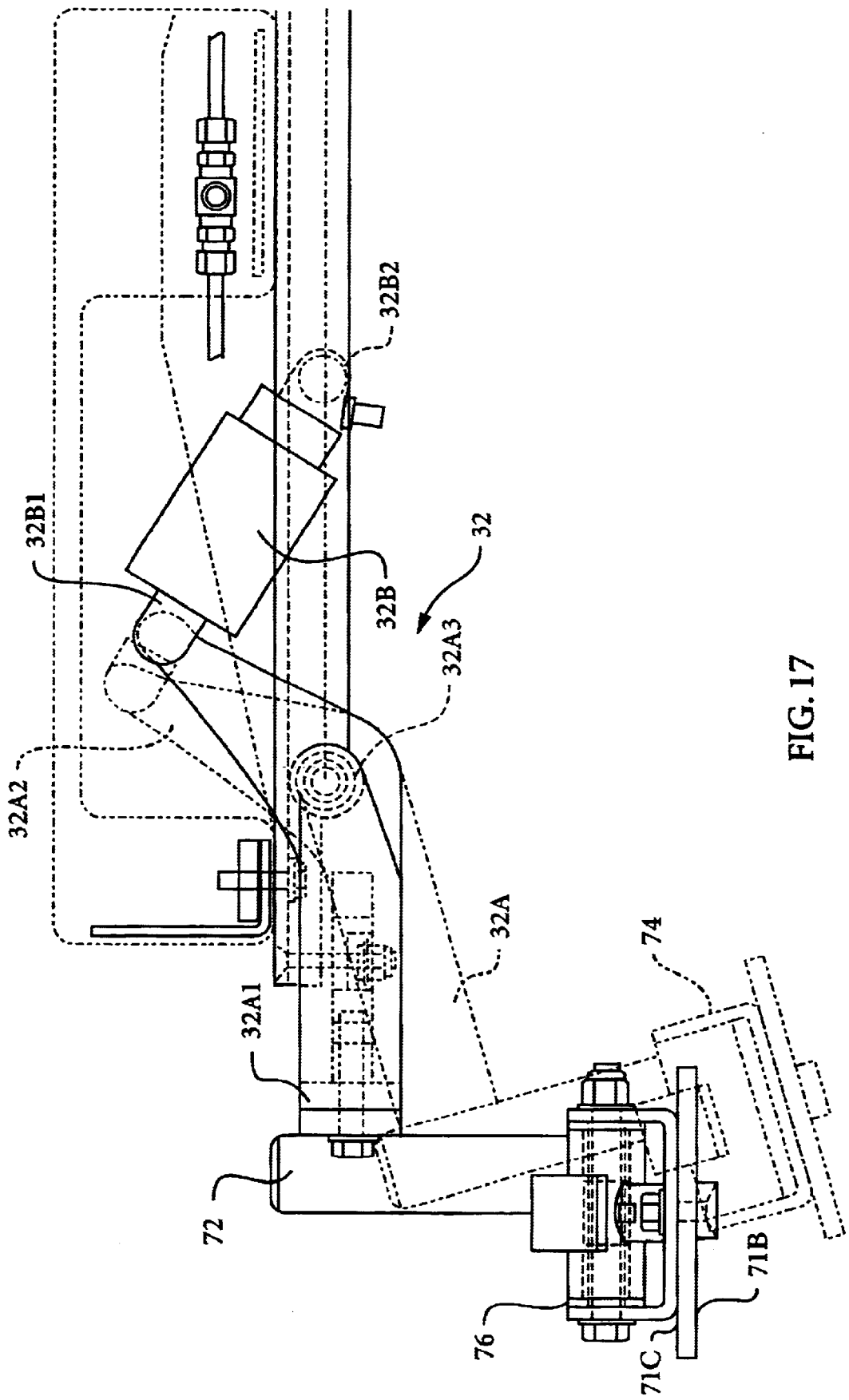
FIG. 17 is a partial rear plan view of the attachment of a rear ski with brake components and showing, in shadow, the "unloaded" attitude of the ski and the relative positions of the suspension components and the fully loaded shock absorber compressed attitude of the ski and the relative positions of the suspension components.
Figure 18:
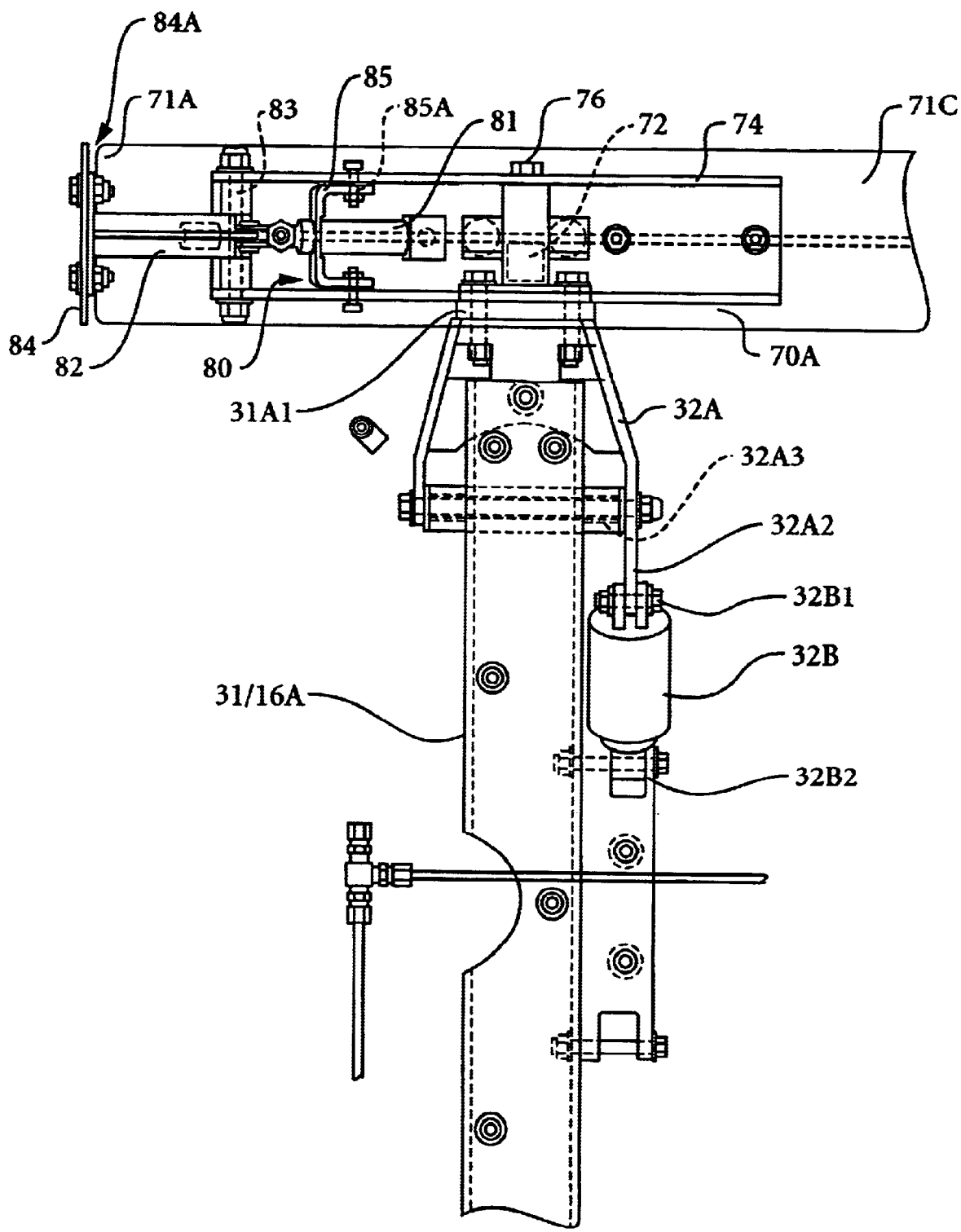
FIG. 18 is a partial top plan view of the left rear ski attached to the rear axle illustrating the a-arm attachment to the ski post, the a-arm pivot point on the axle, the connection of the a-arm to the shock absorber which is attached to the axle at the shock absorber pivot location and also showing the brake blade, brake arm, brake cylinder.
Figure 19A:
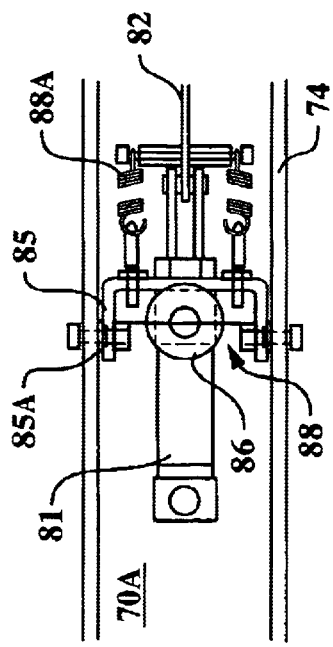
FIG. 19A is a top view of section AA which illustrates the detail of the brake return spring assembly.
Figure 19:
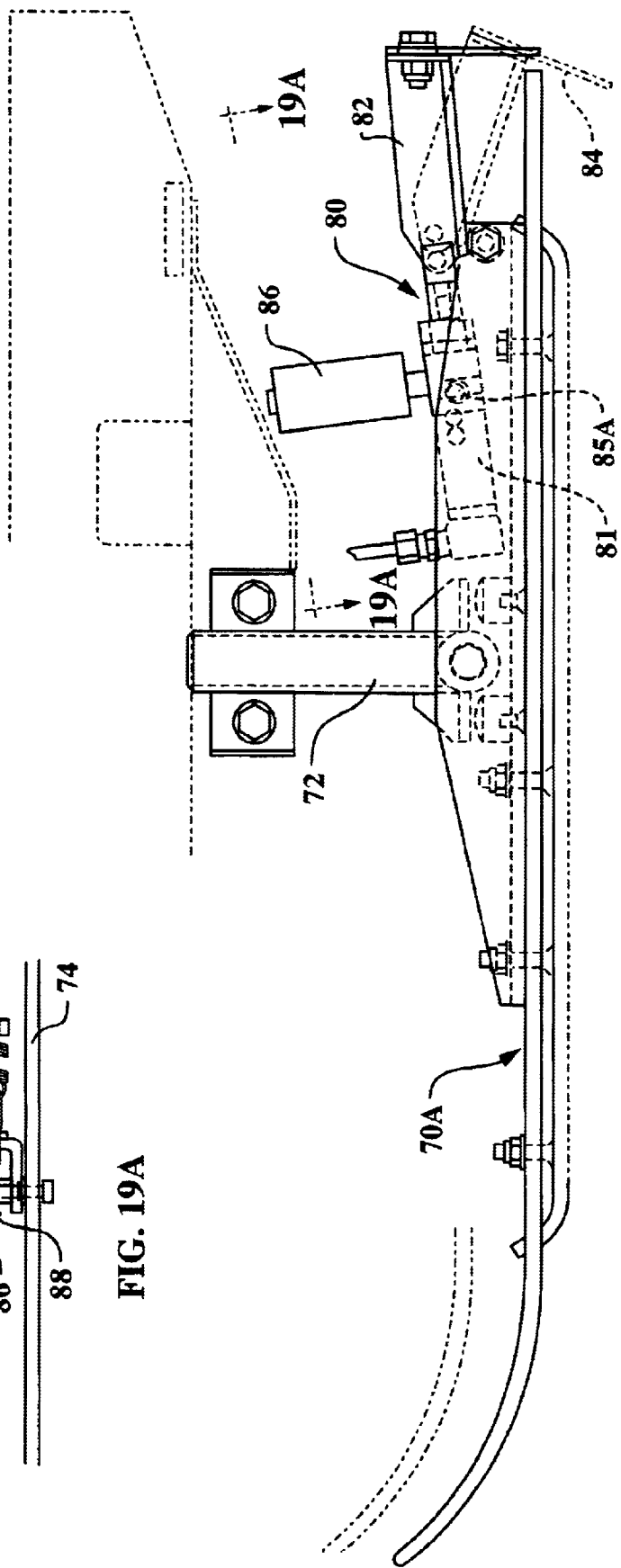
FIG. 19 is a side plan view of the ski assembly of the invention, which shows, in shadow, the change in position of the brake components of the braking assembly.

For the detail of the braking system used with the ski equipped version of the vehicles 10A or 40A, reference is made to FIGS. 16–19. Particularly, FIGS. 16A and 16B illustrates in the partial top plan view in shadow front skis 70A assembled to the front a-arm 32A and also illustrating in shadow the steering linkage, the front brake system 80 including brake return system 88 and the front suspension system 30 and particularly in FIG. 16B is illustrated the "canting" of the skis 70A;

FIG. 17 shows the attachment of a rear ski assembly 70A i.e, the ski assembly having ski brake assembly 80 as a part of ski assembly 70 and also shows, in shadow, the "unloaded" attitude of ski assembly 70A and the relative positions of the suspension components and the fully loaded shock absorber 32B compressed attitude of the ski and the relative positions of the suspension components, i.e., a-arm 32A and the piston of absorber 32B;

FIG. 18 shows a left rear ski 70A attached to means for absorbing shock 32 which is attached to the rear axle 31, the manner of the a-arm 32A attachment to the ski post 72, the a-arm pivot point 32A3 on the axle 31, the connection of the a-arm shock attachment end 32A2 to the shock absorber end 32B1 which shock absorber is attached to the axle at the shock absorber pivot location 32B2 and also showing the brake blade 84, brake arm 82, and the brake cylinder 81. FIG. 19 is a view of the ski assembly 70A of the invention, which shows, in shadow, the change in position of the brake components of the braking assembly 80. FIG. 19A is a top view of section AA which illustrates the detail of the brake return spring assembly 88 along with return springs 88A.

Figure 10:
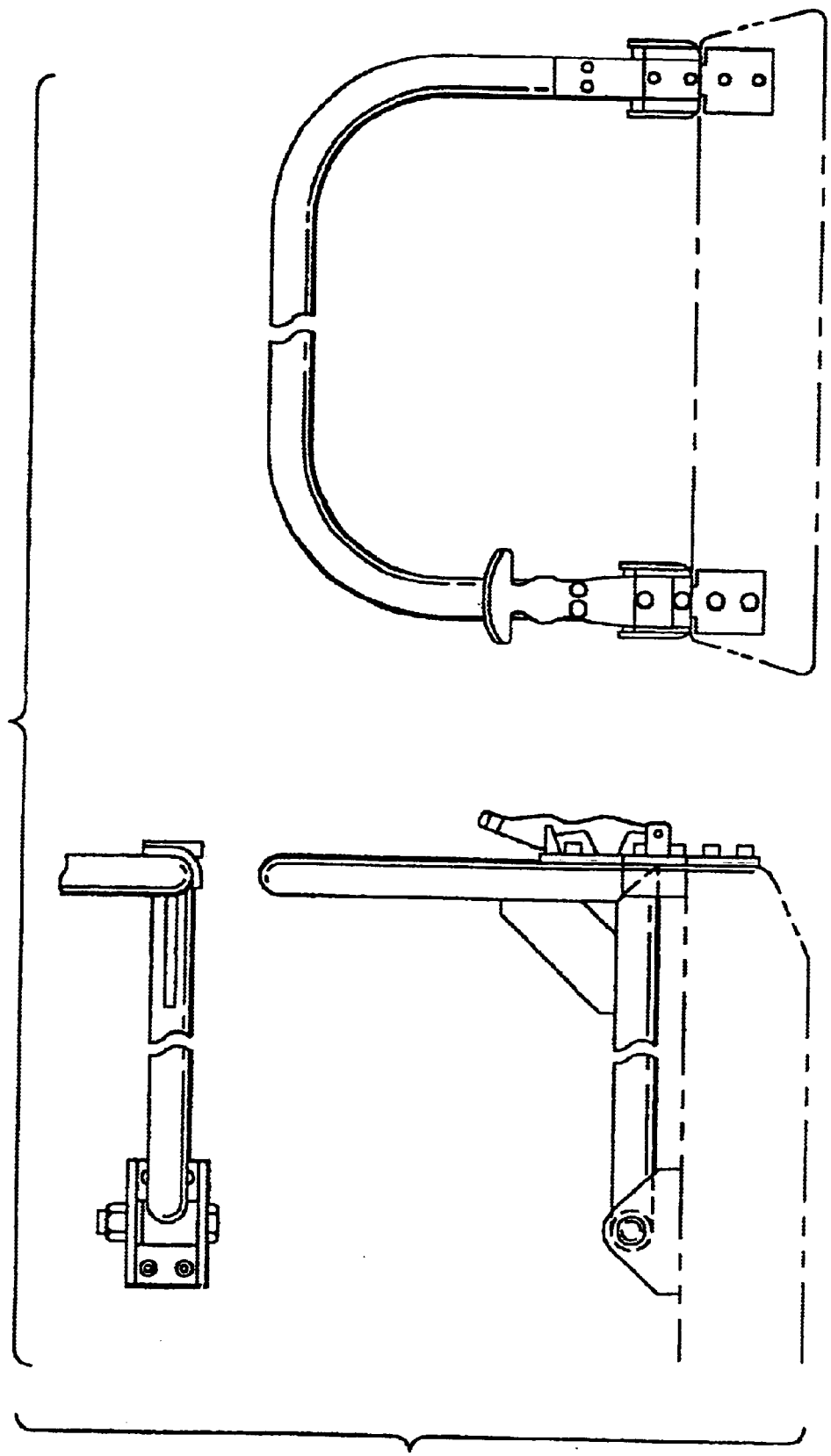
FIG. 10 the two views illustrate detail of the tow-bar assembly which also is a part of the rider restraint system.
Figure 11A:
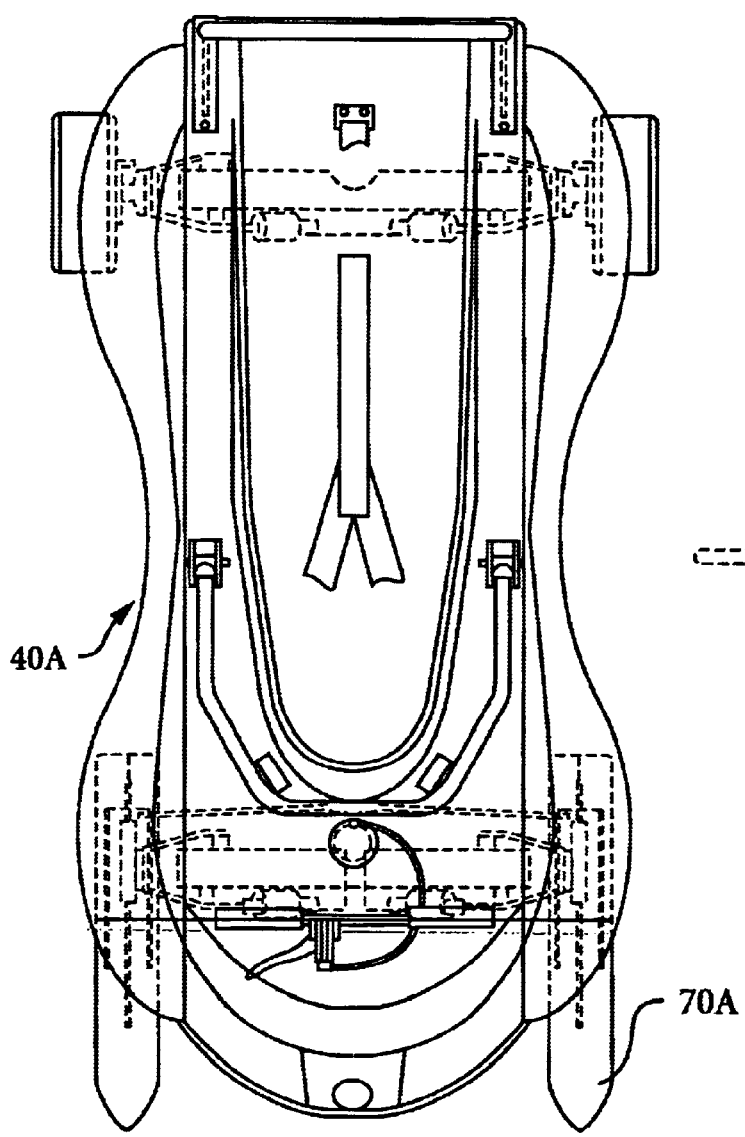
FIGS. 11A, 11B and 11C are a top plan view, and side plan view and a rear plan view respectively showing, in shadow, substantially all of the components and their relationship and which illustrates a wheeled vehicle retrofitted with skis on the front and wheels to the rear.
Figure 11B:
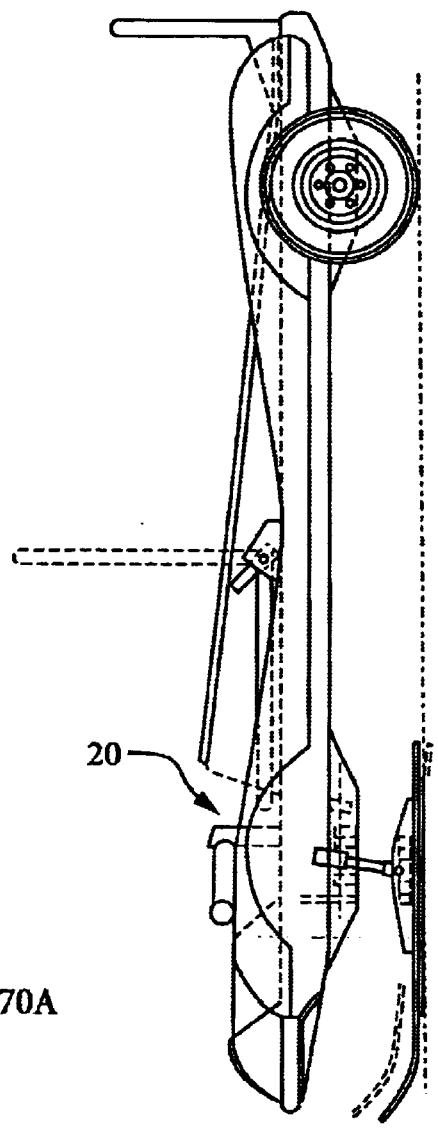
Figure 11C:
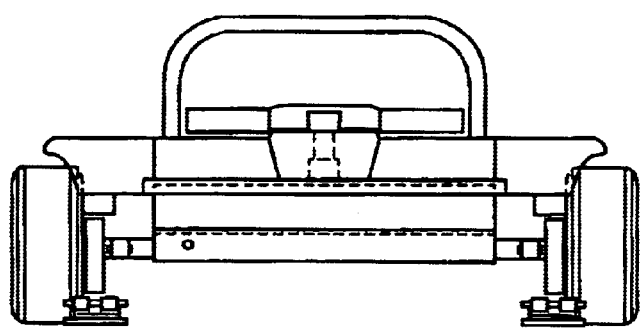
Figure 12A:
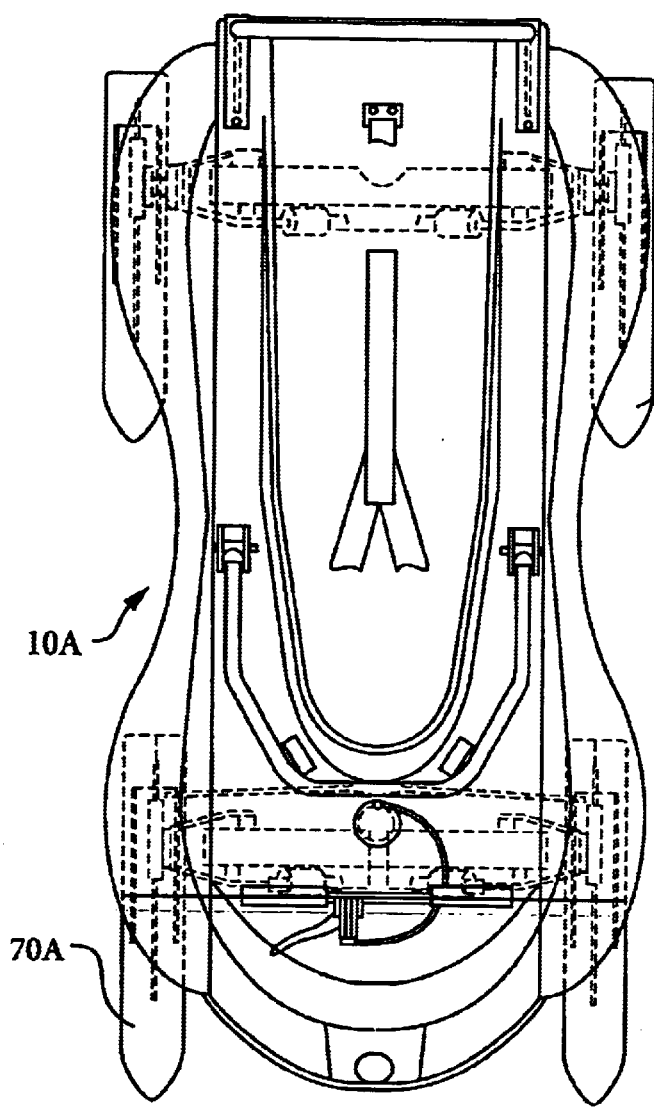
FIGS. 12A, 12B and 12C are a top plan view, and side plan view and a rear plan view respectively showing, in shadow, substantially all of the components and their relationship and which illustrates a wheeled vehicle retrofitted with skis on the front and skis on the rear.
Figure 12B:
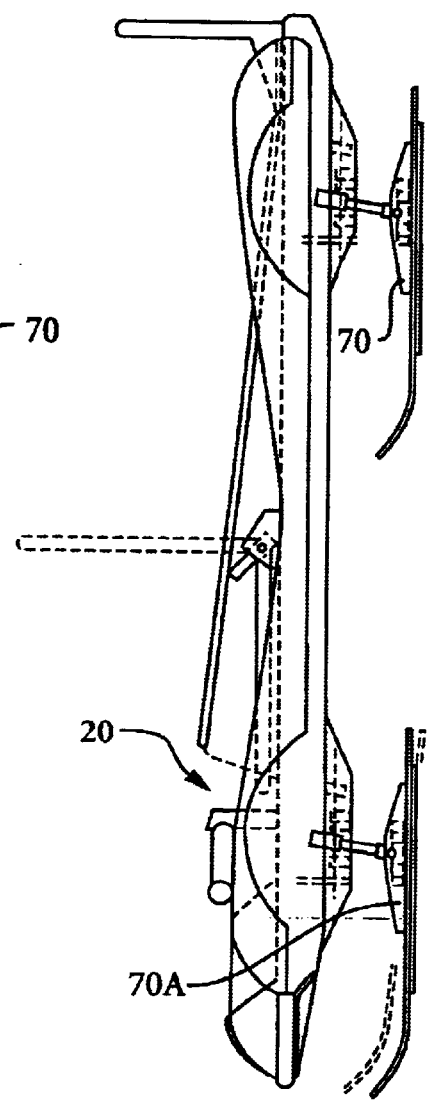
Figure 12C:
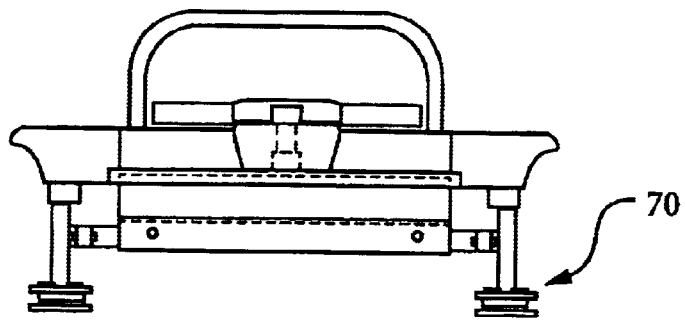
Figure 14A:
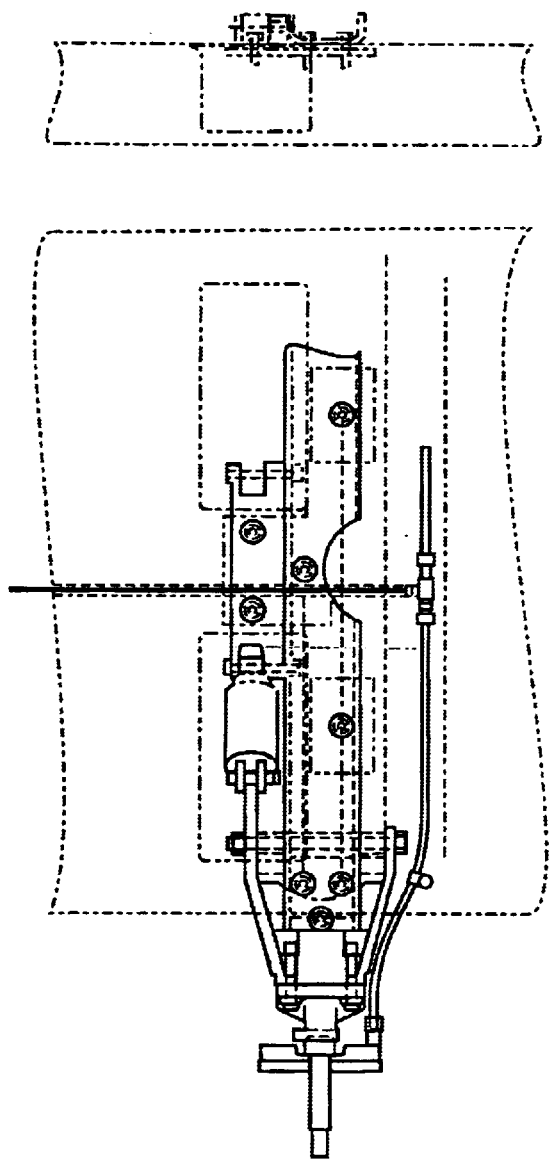
FIGS. 14A and 14B is a combined and sectioned drawing of a top plan view and a rear plan view respectively showing, in shadow, substantially all of the components and their relationship and which illustrates a braking system for a vehicle having wheels in the rear.
Figure 14B:
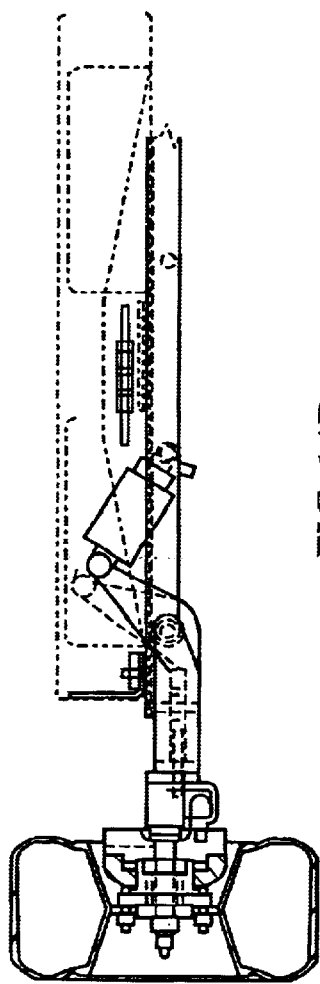

There is provided a combination rear roll bar and transport bail. This bar is hinged so that locked in the folded down position, it tends to confine the legs of the rider and further resists overturning of the vehicle. When this bar is in the unfolded or up position it is useful as a tow or lift bar which may be attachable to a ski lift as an example of use. However, it is possible to have an embodiment of the vehicle without this feature. FIG. 10 illustrates detail of the tow-bar assembly which also is a part of the rider restraint system.

The prone (lying down) low center of gravity design provides control and good visibility. It is also possible that this low position may add to the level of safety for the rider. The extremely low center of gravity provides a relatively stable and safe ride—overturning is nearly impossible.

Figure 2:
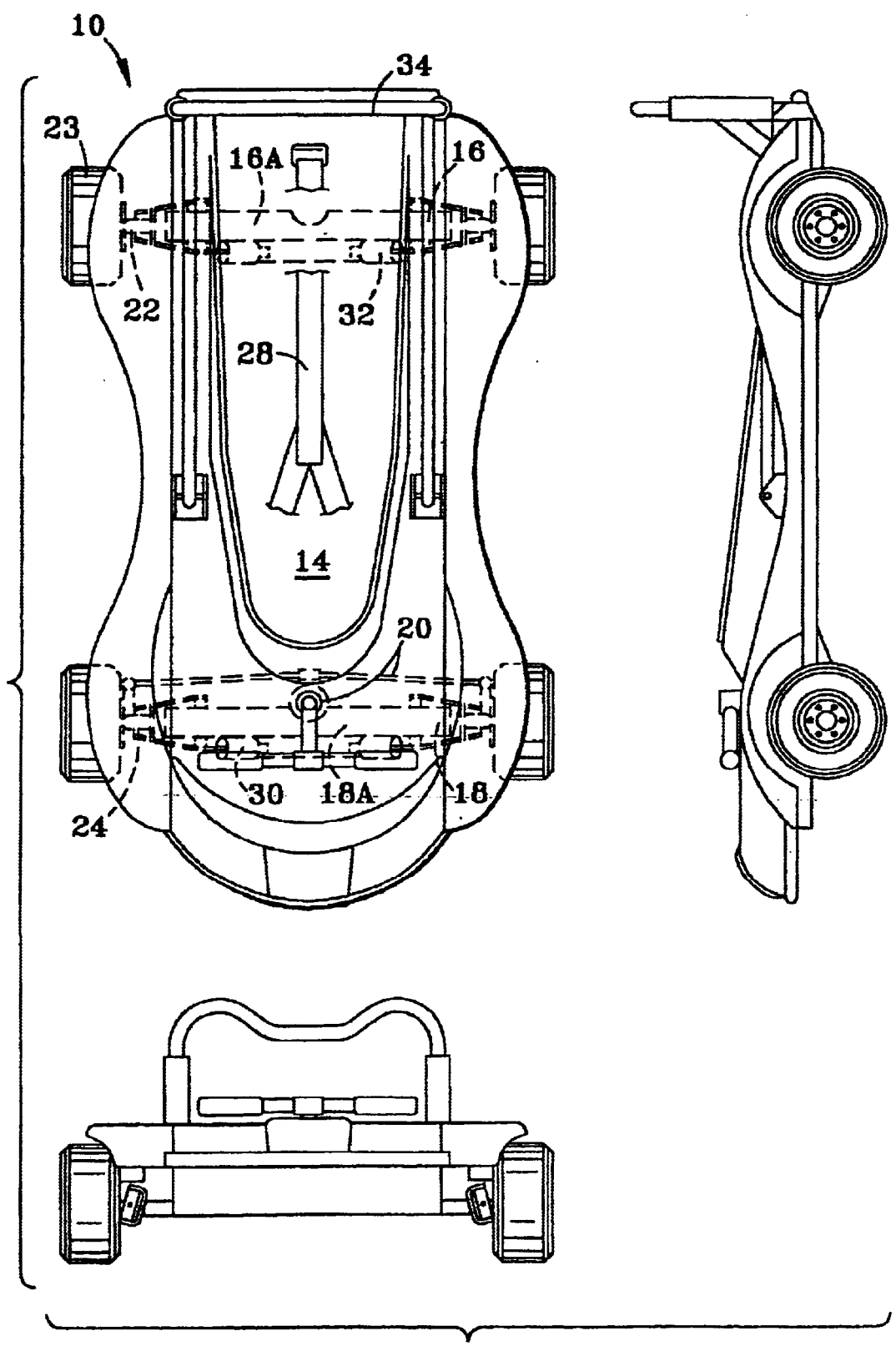
FIG. 2 shows a top plan view of the vehicle, showing, in shadow the axle, steering, and wheel spindles.

There is provided a safety harness which enhances control, stability and rider safety, and which is shown illustrated in FIGS. 2 and 3. The shoulder harness provides rider stability and contributes to rider safety by keeping the rider in place on the vehicle.

There is also an automatic brake which actuates upon release of the hand grips for operation and parking safety. This feature is not essential to the basic embodiment of the invention, however this is an important additional feature. With this safety braking mechanism, the vehicle will be stopped if the rider were to fall off of the vehicle at some point during the operation of the vehicle. Additional to the automatic brake system there may also be a means for causing the vehicle to go into a constant tight turn mode of operation if the rider loses control or if the rider fall from the vehicle while in motion.

The surface of the vehicle on which the rider lays is comprised of a closed cell body pad for rider comfort. There is an elevated chest rest and thick foam mat which provide additional rider comfort and visibility.

In the preferred embodiment, the body and chassis of the vehicle is made from light weight foam core fiberglass reinforced construction. The strong, rigid, impact resistant foam filled fiberglass body with aluminum inserts provides a single framework for attachment of all components. Fiberglass body, plated steel parts, and extensive use of aluminum provide optimum protection from the elements, and from impact damage.

Figure 7:
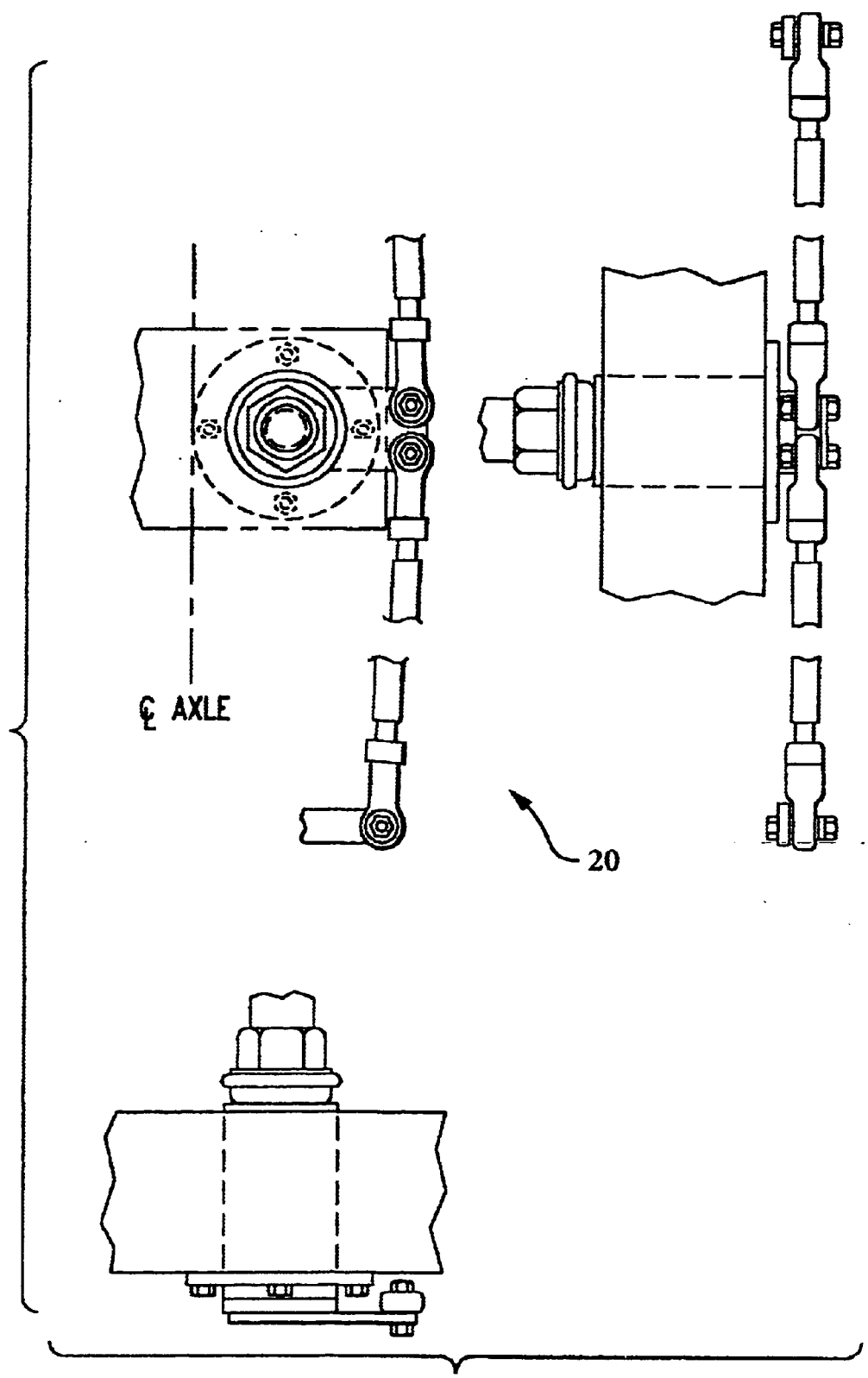
FIG. 7 is a detail view showing the steering linkage in association with the prone steering position of the rider.
Figure 15A:
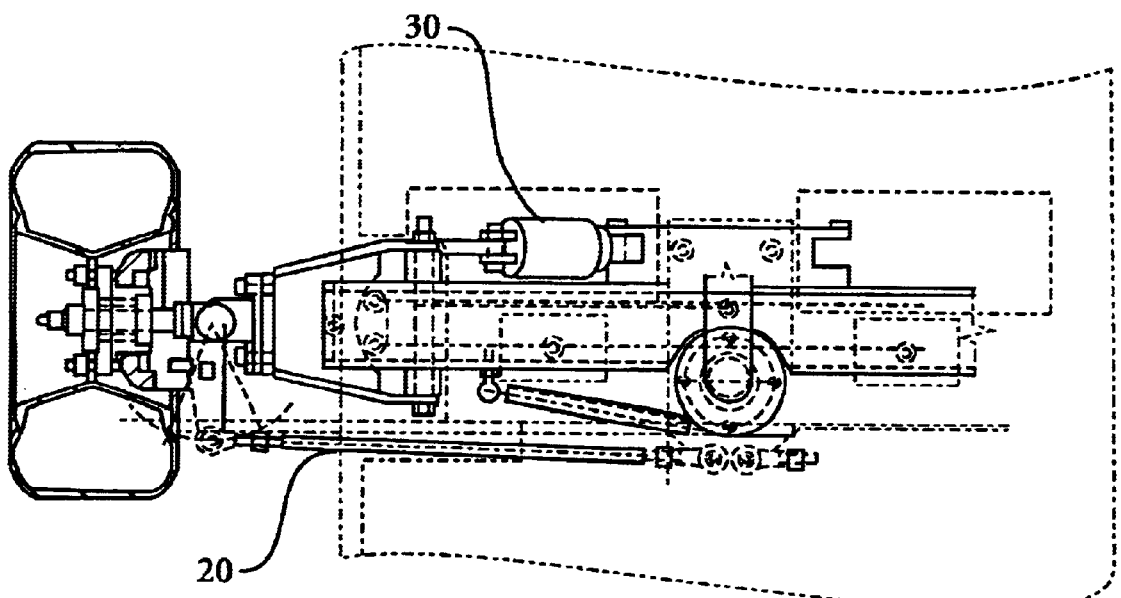
FIGS. 15A and 15B is a combined and sectioned drawing of a top plan view and a rear plan view respectively showing, in shadow, substantially all of the components and their relationship and which illustrates a braking system for a vehicle having wheels in the front.
Figure 15B:
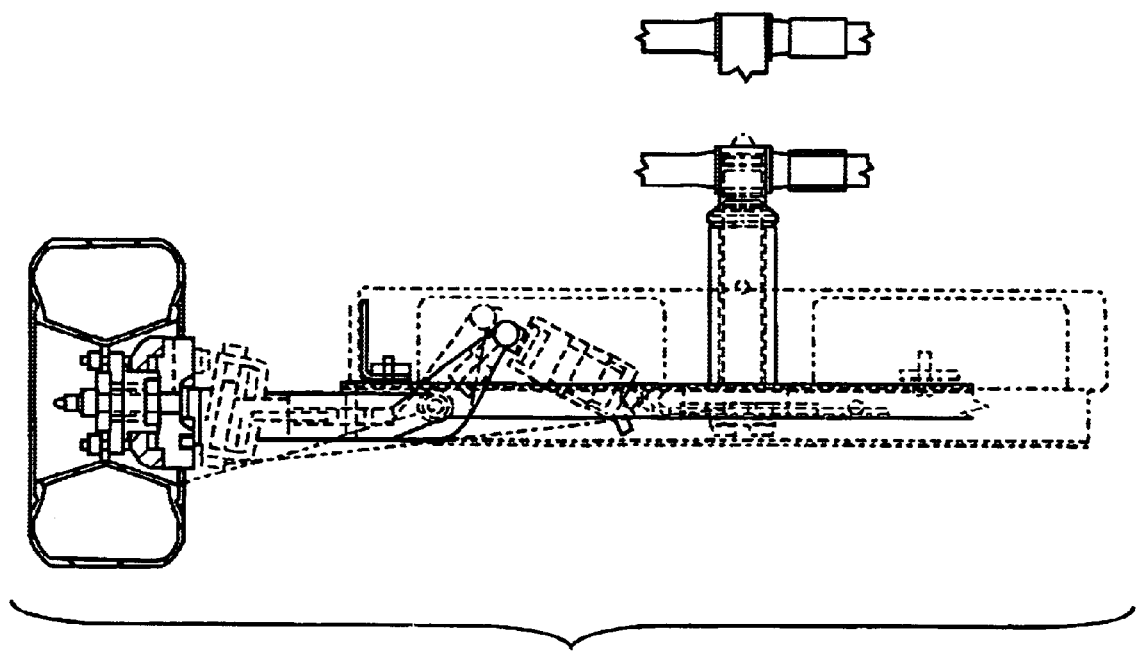
Figure 16A:
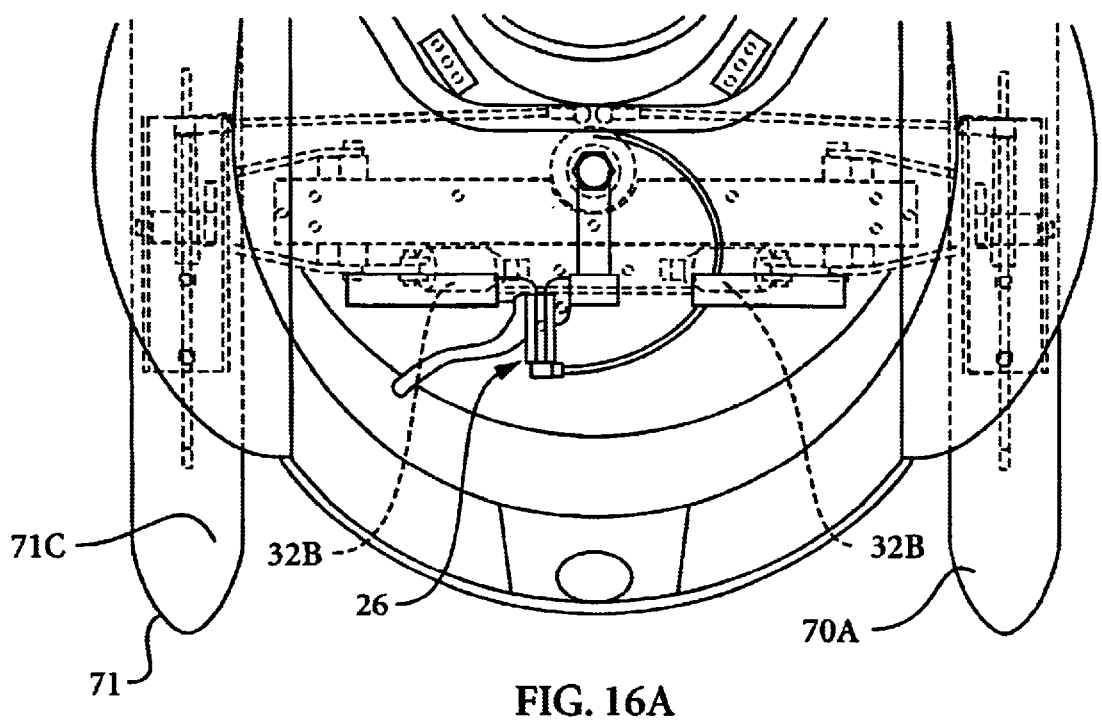
FIGS. 16A and 16B is a top plan view and a rear plan view respectively which illustrates in the partial top plan view in shadow the front skis assembled to the front a-arm and also illustrating in shadow the steering linkage, the front brake system and the front suspension system and particularly in FIG. 16B is illustrated the "canting" of the skis.
Figure 16B:
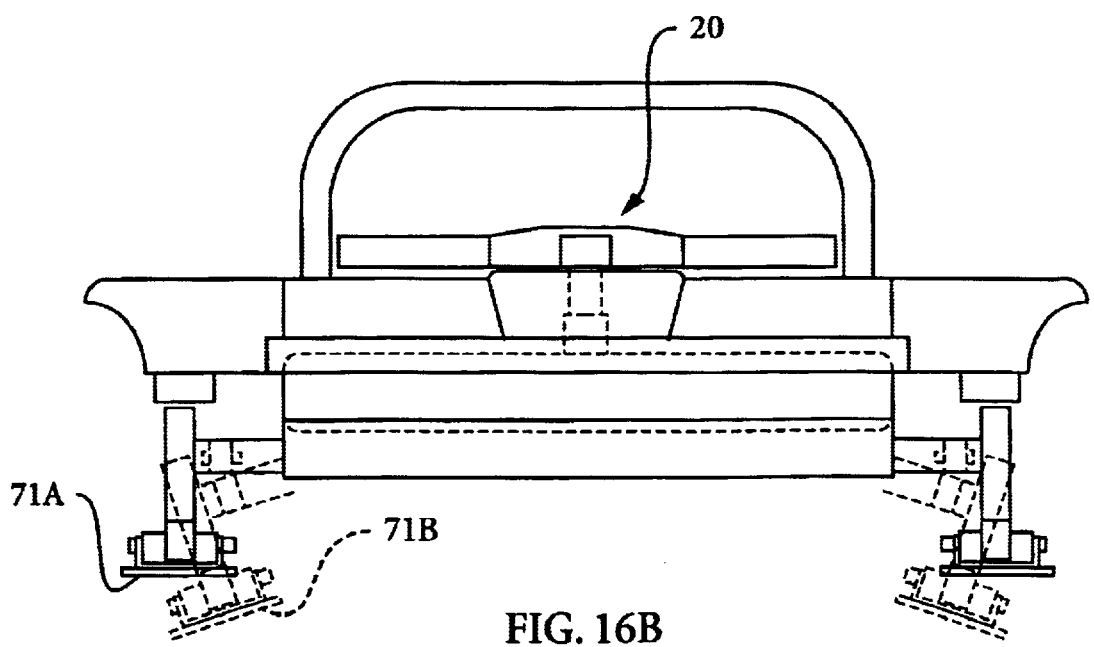

The steering and braking mechanism is a ball bearing bicycle style steering and braking assembly which is positive, responsive and familiar to all to control, thus making learning to ride, and riding the vehicle easier and more comfortable. FIGS. 7 and 15A provide, in combination a detail view showing the prone steering linkage. Substantially the same steering system as shown is FIGS. 7 and 15A is also used in the ski equipped vehicles as shown in FIGS. 11A, 12A, 13A and 16A.

Figure 8:
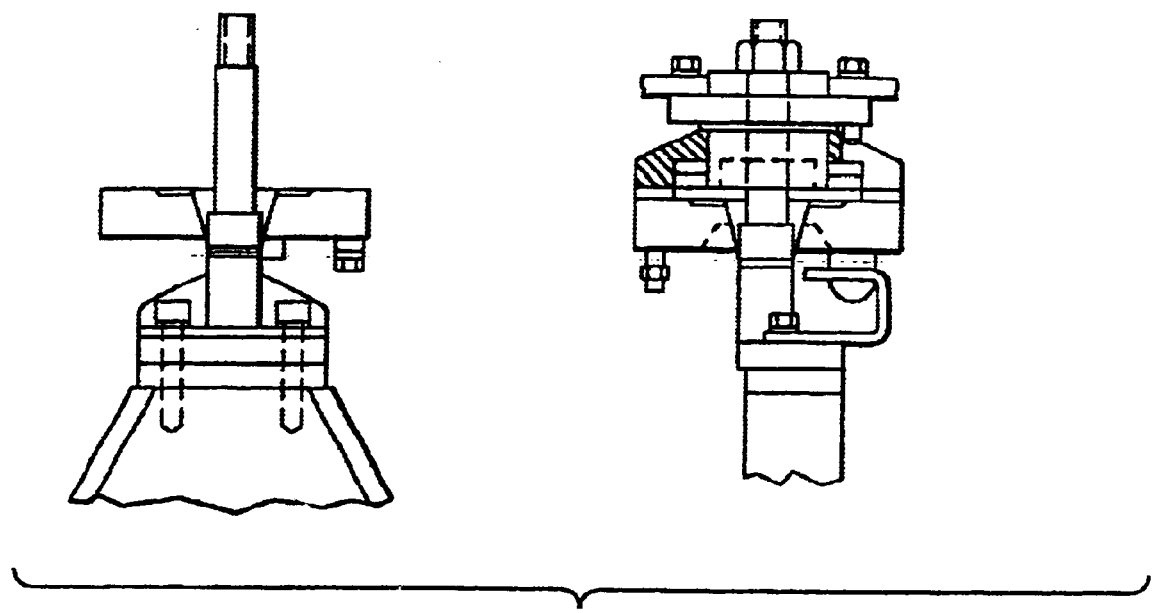
FIG. 8 is a detail view showing the right rear wheel spindle.
Figure 9:
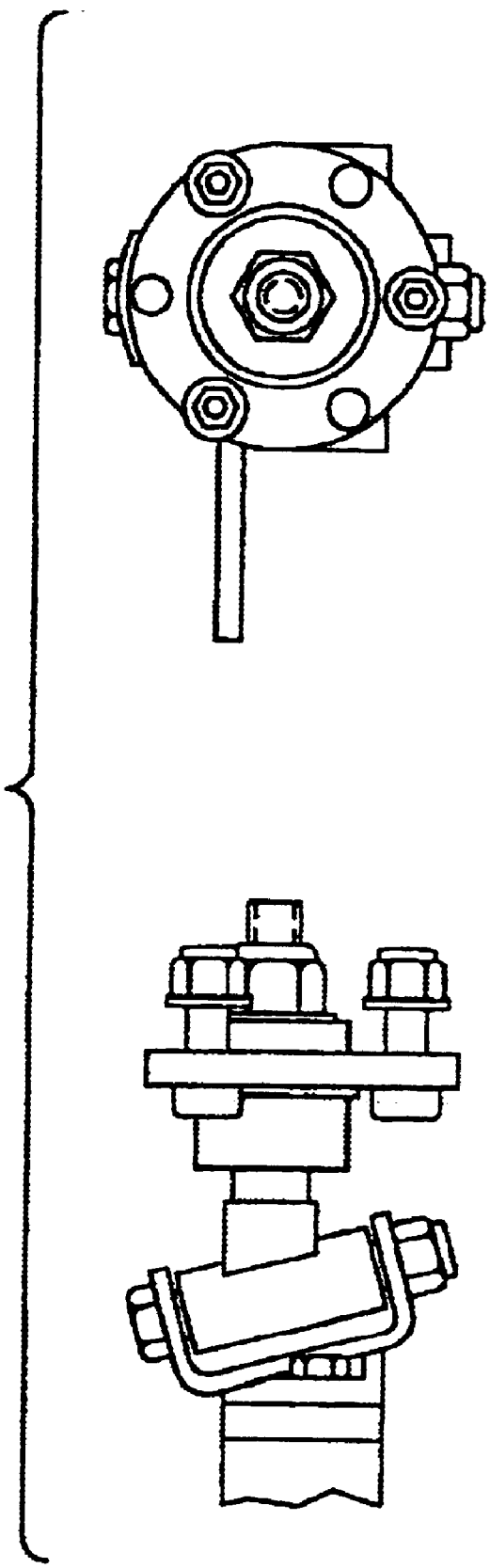
FIG. 9 is a detail view showing the right front wheel spindle.

There are provided precision bearings on all four axles in one embodiment. Independent rear axles provide maximum maneuverability in a four wheeled embodiment. The vehicle may be provided with precision wheel hubs, with pre-lubricated ball bearings, which are maintenance free. In a preferred embodiment the suspension and steering spindle bearings are formed of woven TEFLON or NOMEX and are designed to withstand high impact forces and hostile environments, and provide long life with no maintenance. FIG. 2 shows a top, side, and front plan view of the vehicle showing, in shadow, the axle, steering, and wheel spindles. Also, FIGS. 8 and 9 show a detail view showing the right rear wheel spindle and a detail view showing the right front wheel spindle.

The preferred steering post ball bearings and linkage ball rod ends provide maintenance free, smooth, zero back lash response. Each vehicle may be provided with elastomer bumper strips in the front and the rear which provide impact protection for the vehicle and rider. The preferred steering post, wheel, and front and rear axle assemblies can be removed intact should maintenance be required, thus reducing time and cost of any necessary maintenance.

In a preferred embodiment, the vehicle chassis has a ramp-shaped underbody and detachable covers which offer protection for axles, steering linkage, and suspension from road obstacles. Each vehicle in the preferred embodiments has strong, impact resistant fiberglass fenders which protect the rider from track dirt and contact with the wheels or skis when riding.

Following is a general description of the many technical features and the advantages achieved by the presently disclosed invention. It is material provided to further enhance the level of disclosure and present all of the presently known advantages achieved because of the technical features of the invention.

General Discussion:

A. The Gravity Driven Vehicle with Skis or Combination of Skis and Wheels or Slide Pan While much of the following description is presented as a description of a wheeled vehicle similar to the vehicle of the present invention as described above but which has been retrofitted or specially constructed to result in the vehicle for use on snow covered terrain. It is important to note that the vehicle basically as described above but modified for use on snow may be custom made rather than created from a wheeled version by means for retrofitting the wheeled version. All of the disclosure above is applicable to the disclosure of the ski version of the vehicle except of course that portion which relates to the specifics of the braking system and some aspects of the steering systems.

1. Retro Fit Kits/Ski Version

The retrofit kit is used in conjunction with the gravity driven wheeled vehicle of the present invention or other like products to make the product easily adaptable for use in snow covered conditions. The details of the systems described below apply as a retrofit package or basically describe the components and the function when applied to a gravity driven vehicle custom designed and dedicated for use only on snow. I.e., a wheeled vehicle may be retrofitted with the combination of skis or slide pans or custom designed and built in the same manner. FIGS. 11–13 and 16 illustrate the vehicle with skis in the front and wheels to the rear, skis both front and rear, and skis in front and a slide pan with braking to the rear respectively. It should further be noted that the use of skis and slide pan or slide pans is interchangeable in that they both provide the sliding surface upon which the vehicle rides when in descent on a snow covered surface. A slide pan or ski may be used in any combination in the front in the rear or both front and rear locations of the vehicle.

Front Steering System—FIGS. 11–13 and 16

A unique discovery during the course of the development efforts to create the winter or snow covered terrain version of the gravity driven vehicle occurred in the integration of the skis onto the existing single swing arm suspension design of the wheeled product. As a consequence of the advanced four wheel "A" arm air spring, oil damped suspension—independent four wheel suspension with air/oil shocks or with coil/oil shocks as illustrated in at least FIGS. 4, 5, and the multiple views of FIGS. 11–16 there achieved a smooth, stable ride over surfaces with irregularities ranging from wash board to large bumps. With the mounting of skiis to the A-arm or the wishbone portion of the suspension system, the position or attitude of the outer edge of all skis due to the single arm geometry when there is no rider on the sled and the shocks are operating properly, causes the outer edge of all skis to be constantly engaged with the ground or snow surface. When the sled is being ridden the loading of the shocks, depending on how they are set, causes the skis to change to a more flat or level attitude relative to the snow or to the ground surface. This attitude only reaches a substantially flat attitude if there is extreme loading on the sled body and does so to absorb shock to the sled and rider. After such levels of loading and impulse types of shocks to the sled, the sled always returns to the outer edge engagement posture. Substantially because of this characteristic of ski attitude or the inward canting of the skis when the sled is being ridden, on a modest downhill terrain put in particular when travelling on steeper downhill and upon initiation of turns, the lower or downhill ski becomes more heavily loaded tending to increase the flatness orientation relative to the snow surface yet still resulting in the outer edge carving into the snow. I.e., the outer edge of the ski carves into the snow and as it becomes increasingly loaded the suspension slightly counters the digging or carving action but continues to engage the snow surface. The upper ski or uphill ski, particularly the outer edge, with the lesser loading while in the turn it is still partially canted inwardly, carves as well and even more aggressively because of this canted attitude of the uphill ski in the turn. Alternatively described, the uphill ski acts somewhat as an anchor as this engagement becomes more unloaded in an aggressive turn, the a-arm extends its full travel maintains constant engagement with the snow due to the fact the lower or downhill ski is flattening allowing the attitude of the uphill ski to remain in constant contact with the snow. This unexpected performance characteristic or functionality provides benefits such as for example: the carving action of both skis constantly counterbalancing each other provides tremendous control and maneuverability in virtually every snow condition; and under conditions of heavy loading of the downhill ski, the digging and tipping tendency of the sled is reduced dramatically. To provide further control and maneuverability a keel component may be added to the ski bottoms.

A. The front ski retrofit is attached to the existing front a-arm (wishbone) assembly of the wheeled version with either a double or the single arm/linkage geometry by utilizing the existing fastening system. When fixed to the suspension linkage the ski has the ability to pivot from an axis perpendicular to the axle allowing the tip and heal to pivot in opposition to one another, upwards and downwards and is limited in its pivot by a stop mechanisms mounted to either the ski or the mounting system. The width and length of the selected skis and the forward or rearward positioning of the pivot point is established based upon the terrain and the specific performance requirements desired. The steering geometry has been designed to create a carving action when the skis are turned by the steering linkage. I.e., upon causing a turn using the steering mechanism both ski tips rise slightly, the tails sink slightly and the inner edge of the ski opposite of the direction of the turn and the outer edge of the ski in the direction of the turn tilt slightly downwards into the snow or ice surfaces. These edges can also be described as the ski edges on the inner radius of the turn.

Brake System—FIGS. 13, 16–19

B. The independently or simultaneously actuated right and left, rear, front or rear and front, or independent rear and front combined brakes or single brake actuation unit whether one or divided mechanism is integrated in to the front ski and trailing or sliding pan or ski assemblies that are part of the vehicle/mountain sled retrofit package. The actuation of the mountain sled brake is either mechanical, hydraulic, servo-mechanical, pneumatic or a combination of these technologies. When this solution is used as a retrofit it is intended, whenever and wherever possible, that the existing actuation system or systems be utilized.

Rear Tracking and Control System—FIG. 13

C. The rear brake system or systems is/are integrated into an under body pan covering a portion or all of the sled under body from approximately the middle of the sled length and some distance forward of the rear axle location mounting surfaces and is attached or nearly meets the sled underside and extends sufficiently across the width of the sled in the front in a fixed or in a limited manner with a hinge or slide like interface allowing the pan from the hinge point rearwards to move up and down or to slide or flatten out across the under face of the sled a distance equal to the translated stroke distance of an internally mounted shock system. The pan will be a complete cover with a downward sloping straight or radiused lead edge, running from the mounted or hinged or meeting leading edge and transitioning to a gliding surface that runs almost parallel to the underside of the body or sled frame. The rear pan or ski assemblies will be covering a single or double shock absorption mechanism able to operate independent of or together with each other and the braking mechanism that will be substantially a swing arm or linearly actuated arm or blade that will when actuated protrude out from the pan or ski below their running surfaces and into the snow or ice surface at a positive, negative or right angle to the pan or running surface and will be depth adjustable equal to the geometry and stroke of the actuation. This pan or ski (if chosen) as seen from behind is profiled to provide maximum lateral grip and stability when either turning or gliding. The geometries are optimized to address snow condition and terrain.

Benefits

D. Commercial: The winter retrofit package allows an owner of a summer mountain sled the simplified and flexible solution of utilizing at a minimum a sled body with an integral frame or a sled body with a separate frame. Additionally, depending upon the components of the winter retrofit package, many more of the basic of summer mountain sled components can be used in retrofitting the summer sled for winter recreation such as the axle, suspension, steering and braking systems.

E. Technical: The retrofitted summer sled steering, braking, and rear tracking and control systems provide in the sled retrofitted for winter use all of the already known benefits of summer/wheeled sled including superior control and stability for a snow sledding experience.

2. Alternative Ski Version—Studded Tires

The condition of downhill ice packed or ice covered roadways, trails, paths, etc. presents a braking, steering and control challenge for both a conventional summer mountain sled and a winter mountain sled of any form or configuration. The operational challenge is to provide a sled with a steering and braking solution that handles these conditions. The following embodiment of the invention and declared benefits address this challenge.

A mountain sled equipped with four wheel or three wheel independent or simultaneous braking systems will have its standard tires replaced with slick or profiled tires that have been retrofitted or produced to order with studs, nails, screws, etc. fixed to, inserted into or imbedded in the rolling surface of the tire and protruding from the rolling face of the tire sufficiently to provide contact and grip in the existing ice or ice packed condition on the running surface. The selection of each tire profile and cleat material, cleat geometry and cleat placement and number of cleats is dependent solely on the application surface and can be changed and optimized accordingly to best suit the exact requirements of each downhill surface.

Benefits Alternative Ski Version—Studded Tire Version

This solution has the distinct benefit of providing exceptional control on most every downhill ice covered or ice packed roadway, trail, path, etc. running surface.

I. Due to the fact that only the tires used for summer sport are replaced with tires having studs or nails (or the like) mounted to the tread portion of the tire to provide improved friction interface between the sled and the running surface. All other subsystems, steering, suspension and braking remain the same for the studded tire version as for the summer tire version. The resulting sled has substantially all of the performance advantages of the summer wheeled vehicle.

I Double Arm Independent Suspension (Upper and Lower Control Arm Design)

The challenge of providing superior handling and control of a gravity driven mountain sled is to offer the best technology to achieve differing optimized operating results to meet the demands of the conditions and requirements of various terrains. The integration of certain solutions in a mountain sled with tires or with winter attachments such as in various presented solutions is primarily possible due to the combination of certain existing technologies, materials and compact componentry and by integrating them into various suspension geometries. The advent of small components coming from the mountain bike industry, has permitted mountain sledding to move from being basically unsophisticated toys to sophisticated sports equipment.

Integrated into the mountain sled is a suspension system that displays when viewed from the side (from sled rear to front or front to rear) a suspension geometry that is trapezoidal in form (parallelogram) with all four joints forming pivots and the two sled side, upper and lower fastening points/pivots are fixed in some manner firmly to the sled frame or uni-body or axle system or combination thereof and the spindle or the ski assembly or ski pan assembly is fixed somewhere on the fixed member connecting the outboard pivot points of the trapezoid. As part of this design and resisting loading of the trapezoidal design is an arm that extends at an angle away from one of the inboard trapezoid pivot locations and is an integral mechanical arm to which a shock absorber is attached to the end of arm and to a fixed point on the body, frame or axle system and both ends of the shock absorber can pivot. This geometry allows the upright mounting face for the spindle or ski or pan to move the spindle or ski or snow pan assembly upward and downward when the sled is pointed straight forward and when the sled itself has certain load exerted and released such that the tire, ski or pan maintains complete contact of its lower running surface with the operating surface, the running surface remains parallel with itself as it is loaded and unloaded. The longitudinal motion of the entire assembly is limited by the stroke of the shock absorber and the operating envelope of the related mechanics. This design permits minimal axial motion of the contact running surface as it is loaded and unloaded called scrubbing. This scrubbing action is considerably less than that witnessed by the solution already presented in the claim from TSI with a single arm solution.

Benefits

This solution gives the clear benefits of

II. Maintaining constant and maximum contact of the entire running face of the tire, ski, and pan solutions with the running surface.
III. Reduces scrubbing and non-uniform wear of the running surfaces of the tires, skis and pans.
IV. Simplifies steering geometry compound angles allowing maximization of ski contact and carving benefits. This system is highly recommended for applications utilizing skis and sliding pan systems.

II Integrated Body & Frame Solution

The body design and construction for the instant vehicle represents the latest form of taking the idea of monocoque or body integral frames and eliminating the need for conventional frames and separate bodies for use in mountain sled, sleds and sled product applications. This idea utilizes the fiberglass upper and lower body components known as or halves and sandwiches them together and imbeds inserts to add strength, to bond the halves, to stiffen the body and to take maximum advantage of the collective strength of each system. This solution accommodates and allows the fiberglass to be a connecting structure through the use of adhesives and epoxies that are part of the normal fiberglassing process of dissimilar materials. This permits the combination of a variety of materials that would not otherwise be combined in a conventional fame/body construction. The imbedded materials then are optimized for their ability to retain fasteners, to choose material that accommodates extreme variations in temperature, adequately spread load across the fiberglass surface and eliminating extra material where it is unnecessary.

Benefits

The benefits from such a solution are;

I. Provides singular body and frame system, simplifying assembly, inventory and repair.
II. Makes maximum use of the strength and stiffness of each system.
III. Allow adaptability and design modifications when new materials come available without requiring the whole design be changed.

There are additional subsystems which may be incorporated into the gravity driven vehicle of each of the embodiments described such as for example:

Rollover protection
Steering damping
Accessories such as headlights, speedometer
Adjustable steering ratios
Prone sled body angle support system
Complete braking system i.e., one system for the front and one for the rear which may use two (2) independent master cylinders and brake circuits.

Detail Relative to the Suspension System, the Ski Assembly and The Braking System Suspension geometry action and performance contribution to tracking and steering control: The existing, previously disclosed single A-arm suspension geometry provides the ability to present the outer edge of four skis, when mounted to a two opposing arm axle assemblies, to the snow at an angle to the running surface which delivers significant unique, maneuvering and steering control performance in most all snow conditions. This performance results from the fact that a carving geometry of the skis to the snow occurs. This engagement with the running surface is equally as consistent improves as the sled is underway and is caused to turn through the steering linkage. In a turn or as one is traversing a downhill slope the outboard or downhill ski receives increased load and the ski engages more with the snow/ice running surface until such time that the load on this ski begins to overcome the resisting force of the shock attached to the shock anchor point on the A-arm and the axle. As the resisting force (ajustable) is gradually overcome the A-arm begins to pivot at the A-arm pivot and ski assembly begins to move toward a flatter orientation with the snow. This action helps to avoid over powering the engagement of the downhill ski downhill edge and helping to avoid overturning. Simultaneously, the uphill ski is less loaded but still has its outer edge engaged in the snow and creates a scrapping action on the adjacent downhill snow/ice as well as packing what ever loose snow is present under the underside of the ski. This uphill ski performance improves as the downhill ski continues to flatten in respect to the running surface and loading. Additionally, the underside of any and all skis can be equipped with various geometry keels to assist in linear or turn tracking of all skis as they, under suspension applied compressive loads, present more ski surface and the keels to the running surface. There are always limits to this performance resulting from excessive speed and surface conditions, etc.

Ski Pivot Action and Performance Contribution:

The Ski foot and post pivot allows any ski when traveling over uneven surfaces to follow the terrain contour more closely. The swing motion allowed by this feature is limited by the presence of bumpers mounted on the ski foot which contact ski post extensions when pivot travel limits are reached. This function delivers another benefit because of the ability to allow the ski to follow the terrain more closely that being it causes the brake mounted on the attached ski assembly to achieve more consistent contact with running surface.

Braking Alternative A: Brake Action and Performance Contribution:

The brake assembly developed by the applicants provides superior braking action in various snow and ice conditions. The brake assembly has a hydraulic piston actuated lever equipped with a brake blade. This brake is actuated through the introduction of hydraulic pressure into the input port, the pressure causes the piston shaft to extend from the cylinder in the direction of the rear of the ski, the shaft is attached to the brake lever which begins to pivot at the brake lever pivot and rotates the lever with the attached blade toward the running surface until such point that the full stroke piston and the lever has been reached. The developed solution looked to achieve maximum force, with limited space by using a short stroke cylinder and applying multiple ratio motion at the brake tip. Currently, the solution developed provides practically two inches of travel at the brake tip. The solution utilizes external extension springs to assist the brake return when no longer under hydraulic pressure. The solution is further supported by the presence of an expansion tank mounted to and on the non-pressure side of the brake actuation cylinder. The expansion cylinder is partially filled with the same fluid used to actuate the piston and then securely plugged. This expansion tank provides three benefits, closed system that does not allow air to enter the non-pressurized side of the system and contaminate the pressurized side of the system if air were to get by the piston seals, this non-pressurized side of the system could be used to introduce opposing pressure by filling it with more fluid and when compared with an open ended system where an air vent is present to relieve pressure this solution eliminates the likelihood of drawing contaminants such as water into the cylinder or by the piston seals into the pressurized fluid side of the system.

Braking Alternative B: Brake Action and Performance Contribution:

The brake assembly developed by the applicants provides superior braking action in various snow and ice conditions. The brake assembly depicted in print number(s) _____ shows a hydraulic piston actuated lever equipped with a brake blade. This brake is actuated through the introduction of hydraulic pressure into the input port, the pressure causes the piston shaft to retract extend from the fully extended position away from the rear end of the ski, the shaft is attached to the brake lever which begins to pivot at the brake lever pivot and rotates the lever with the attached blade upwards away from and out of the running surface until such point that the full stroke piston and the lever has been fully retracted. The developed solution looked to achieve maximum force, with limited space by using a short stroke cylinder and applying multiple ratio motion at the brake tip. Currently, the solution developed provides practically two inches of travel at the brake tip. The solution utilizes external extension springs to assist the brake return when no longer under hydraulic pressure. The solution is further supported by the presence of an expansion tank mounted to and on the non-pressure side of the brake actuation cylinder. The expansion cylinder is partially filled with the same fluid used to actuate the piston and then securely plugged. This expansion tank provides three benefits, closed system that does not allow air to enter the non-pressurized side of the system and contaminate the pressurized side of the system if air were to get by the piston seals, this non-pressurized side of the system could be used to introduce opposing pressure by filling it with more fluid and when compared with an open ended system where an air vent is present to relieve pressure this solution eliminates the likelihood of drawing contaminants such as water into the cylinder or by the piston seals into the pressurized fluid side of the system.

The gap between the rear end of the ski and the brake blade is critical. The development of this ski brake determined that when braking, the disturbed running surface, snow, ice, etc. needs to find a place to release the braking loads and if this release location is readily available between the blade and the ski it will escape at that point, evidenced through the plume, rooster tail that gets larger the larger the gap and the higher the speed. Conversely, when the gap is reduced to a minimum the loads, forces, energy is then captured under the ski and greatly increases brake drag and brake performance.

While these additional subsystems are not being described in detail herein, it is certainly within the skill of the ordinary artisan in the field of mechanics and mechanical design to understand and implement many types of mechanisms or systems addressing the incorporation of any or all of the above subsystems into any one of the vehicles as described as the instant invention.

It is thought that the present gravity driven steerable vehicle, for use in riding or racing primarily down hill over varied terrain, and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Elements of the Invention
10 A four wheeled gravity driven steerable vehicle
10A A four ski equipped gravity driven steerable vehicle
12 a chassis having
   12A chassis front portion,
   12B chassis rear portion,
   12C chassis underside and
   12D chassis top side;
14 a rider riding surface on said chassis top side 12D configured to cause a rider to said ride riding surface 14 to be oriented in a prone, face down, face forward position;
16 means for attaching a rear axle assembly 16A substantially at said chassis rear portion 12B;
   16A a rear axle assembly
18 means for mounting a front axle assembly 18A substantially at said chassis front portion 12A;
   18A a front axle assembly
20 means for steering said gravity driven steerable wheeled vehicle 10 by said rider when said rider is positioned on said rider riding surface 14;
22 rear wheel hub and spindle assemblies integral with said rear axle assembly 16A;
23 wheels and tires
24 front wheel hub and spindle assemblies integral with said front axle assembly 18A.
26 braking system or means for causing deceleration and haulting of motion of said vehicle 10 when said vehicle has motion.
28 means for harnessing the rider onto and into said rider riding surface 14 when said rider is positioned on said vehicle 10
30 means for absorbing shock exerted on each said front wheels and tires 23 attached to each said two front wheel hub and spindle assemblies 24 thereby damping shock caused by said vehicle 10 passing over rough terrain, between said front wheels and tires 23 and said front axle assembly 18A;
32 means for absorbing shock exerted on each said rear wheels and tires 23 attached to each said two rear wheel hub and spindle assemblies 22 thereby damping shock caused by said vehicle 10 passing over rough terrain, between said rear wheels and tires 23 and said rear axle assembly 16A;
31 axle component
32A a-arm
   32A1 wheel and ski assembly attachment end
   32A2 Shock absorber pivotal attachment end
   32A3 a-arm pivot attached to axle 31
32B shock absorber
   32B1 shock absorber a-arm end
   32B2 shock absorber axle pivotable attachment end
34 combination rear roll bar and transport bail
40 A three wheeled gravity driven steerable wheeled vehicle
40A A gravity driven steeable vehicle with two skis in front and two wheels in the rear
70 ski assembly without ski braking assembly for attaching to a-arm
   71 ski front end
      71A ski rear end/tail,
      71B ski running surface and
      71C ski upward-facing surface
72 ski post
74 ski foot
76 ski pivot 70A ski assembly with ski braking assembly
80 ski braking assembly
    84 brake blade
        84A gap between brake blade and ski rear end
    82 brake arm
    83 brake arm pivot
    81 brake cylinder
    85 brake cylinder mounting and pivot bracket
        85A brake cylinder pivot
    86 sealed brake cylinder reservoir
    88 brake return assembly
        88A brake return springs
        88B

We claim:

1. A gravity driven steerable wheeled vehicle comprising:
a chassis having a front portion, a rear portion, an underside and a top side;
a rider riding surface on said chassis top side configured to cause a rider on said rider riding surface to be oriented in a prone, face down, face forward position;
means for attaching a rear axle assembly substantially at said chassis rear portion;
means for mounting a front axle assembly substantially at said chassis front portion;
means for steering said gravity driven steerable vehicle by said rider when said rider is positioned on said rider riding surface;
at least one but not more than two rear wheel hub and spindle assemblies integral with said rear axle assembly, said rear axle assembly operably connecting a rear linkage geometry with said at least one but not more than two rear wheel hub and spindle assemblies;
at least one but not more than two front wheel hub and spindle assemblies integral with said front axle assembly, said front axle assembly operably connecting a front linkage geometry with said at least one but not more than two front wheel hub and spindle assemblies; and
means for retrofitting said gravity driven steerable wheeled vehicle with at least one ski assembly assembleable to at least one of said at least one but not more than two rear axle assemblies and said at least one but not more than two front axle assemblies, wherein said means for steering said gravity driven steerable wheeled vehicle comprises a steering system for steering said rear axle assembly.

2. A gravity driven steerable wheeled vehicle comprising:
a chassis having a front portion, a rear portion, an underside and a top side;
a rider riding surface on said chassis top side configured to cause a rider on said rider riding surface to be oriented in a prone, face down, face forward position;
means for attaching a rear axle assembly substantially at said chassis rear portion;
means for mounting a front axle assembly substantially at said chassis front portion;
means for steering said gravity driven steerable vehicle by said rider when said rider is positioned on said rider riding surface;
at least one but not more than two rear wheel hub and spindle assemblies integral with said rear axle assembly, said rear axle assembly operably connecting a rear linkage geometry with said at least one but not more than two rear wheel hub and spindle assemblies;
at least one but not more than two front wheel hub and spindle assemblies integral with said front axle assembly, said front axle assembly operably connecting a front linkage geometry with said at least one but not more than two front wheel hub and spindle assemblies;
means for retrofitting said gravity driven steerable wheeled vehicle with at least one ski assembly assembleable to at least one of said at least one but not more than two rear axle assemblies and said at least one but not more than two front axle assemblies;
means for causing deceleration and halting of motion of said vehicle when said vehicle has motion;
means for harnessing the rider onto and into said rider riding surface when said rider is positioned on said vehicle;
means for absorbing shock exerted on said at least one ski attached to said at least one but not more than two front axle assemblies thereby damping shock, caused by said vehicle passing over rough terrain, between said at least one ski and said front axle assembly; and
means for absorbing shock exerted on said at least one ski attached to said at least one but not more than two rear axle assemblies thereby damping shock, caused by said vehicle passing over rough terrain, between said at least one ski and said rear axle assembly, wherein said means for steering said gravity driven steerable wheeled vehicle comprises a steering system for steering said rear axle assembly.

3. A gravity driven steerable wheeled vehicle comprising:
a chassis having a front portion, a rear portion, an underside and a top side;
a rider riding surface on said chassis top side configured to cause a rider on said rider riding surface to be oriented in a prone, face down, face forward position;
means for attaching a rear axle assembly substantially at said chassis rear portion;
means for mounting a front axle assembly substantially at said chassis front portion;
means for steering said gravity driven steerable vehicle by said rider when said rider is positioned on said rider riding surface;
at least one but not more than two rear wheel hub and spindle assemblies integral with said rear axle assembly, said rear axle assembly operably connecting a rear linkage geometry with said at least one but not more than two rear wheel hub and spindle assemblies;
at least one but not more than two front wheel hub and spindle assemblies integral with said front axle assembly, said front axle assembly operably connecting a front linkage geometry with said at least one but not more than two front wheel hub and spindle assemblies; and
means for retrofitting said gravity driven steerable wheeled vehicle with at least one ski assembly assembleable to at least one of said at least one but not more than two rear axle assemblies and said at least one but not more than two front axle assemblies,
wherein said means for steering said gravity driven steerable wheeled vehicle comprises a steering system for steering said front axle assembly, wherein said means for steering said gravity driven steerable wheeled vehicle further comprises a steering system for steering said rear axle assembly.

4. A gravity driven steerable wheeled vehicle comprising:
a chassis having a front portion, a rear portion, an underside and a top side;

a rider riding surface on said chassis top side configured to cause a rider on said rider riding surface to be oriented in a prone, face down, face forward position;

means for attaching a rear axle assembly substantially at said chassis rear portion;

means for mounting a front axle assembly substantially at said chassis front portion;

means for steering said gravity driven steerable vehicle by said rider when said rider is positioned on said rider riding surface;

at least one but not more than two rear wheel hub and spindle assemblies integral with said rear axle assembly, said rear axle assembly operably connecting a rear linkage geometry with said at least one but not more than two rear wheel hub and spindle assemblies;

at least one but not more than two front wheel hub and spindle assemblies integral with said front axle assembly, said front axle assembly operably connecting a front linkage geometry with said at least one but not more than two front wheel hub and spindle assemblies;

means for retrofitting said gravity driven steerable wheeled vehicle with at least one ski assembly assembleable to at least one of said at least one but not more than two rear axle assemblies and said at least one but not more than two front axle assemblies;

means for causing deceleration and halting of motion of said vehicle when said vehicle has motion;

means for harnessing the rider onto and into said rider riding surface when said rider is positioned on said vehicle;

means for absorbing shock exerted on said at least one ski attached to said at least one but not more than two front axle assemblies thereby damping shock, caused by said vehicle passing over rough terrain, between said at least one ski and said front axle assembly; and means for absorbing shock exerted on said at least one ski attached to said at least one but not more than two rear axle assemblies thereby damping shock, caused by said vehicle passing over rough terrain, between said at least one ski and said rear axle assembly, wherein said means for steering said gravity driven steerable wheeled vehicle comprises a steering system for steering said front axle assembly, wherein said means for steering said gravity driven steerable wheeled vehicle comprises a steering system for steering said rear axle assembly.

5. The gravity driven steerable wheeled vehicle according to claim 4 wherein said means for causing deceleration and halting of motion of said vehicle is at least one brake mechanism selected from a group consisting of mechanical, hydraulic, servo-mechanical, pneumatic and a combination of mechanical, hydraulic, servo-mechanical, and pneumatic, said brake mechanism braking said skiis assembled to said front axle assemblies.

* * * * *